Sept. 22, 1964　　　W. E. VAN HORNE ETAL　　　3,149,900
MULTIPLE GRAPH RECORDER-ANNUNCIATOR
Filed Sept. 22, 1961　　　　　　　　　　　　11 Sheets-Sheet 1

INVENTORS
WILLIAM E. VAN HORNE
GLENROY W. BARNETT
MARION FREDERICK GODDARD

BY
ATTORNEY

Sept. 22, 1964  W. E. VAN HORNE ETAL  3,149,900
MULTIPLE GRAPH RECORDER-ANNUNCIATOR
Filed Sept. 22, 1961  11 Sheets-Sheet 2

INVENTORS
WILLIAM E. VAN HORNE
GLENROY W. BARNETT
MARION FREDERICK GODDARD
BY
ATTORNEY

Sept. 22, 1964 W. E. VAN HORNE ETAL 3,149,900
MULTIPLE GRAPH RECORDER-ANNUNCIATOR
Filed Sept. 22, 1961 11 Sheets-Sheet 3

INVENTORS
WILLIAM E. VAN HORNE
GLENROY W. BARNETT
MARION FREDERICK GODDARD
BY
ATTORNEY

Sept. 22, 1964 W. E. VAN HORNE ETAL 3,149,900
MULTIPLE GRAPH RECORDER-ANNUNCIATOR
Filed Sept. 22, 1961 11 Sheets-Sheet 4

INVENTORS
WILLIAM E. VAN HORNE
GLENROY W. BARNETT
MARION FREDERICK GODDARD
BY Philip M. Dimson
ATTORNEY Sept. 22, 1964

W. E. VAN HORNE ETAL 3,149,900

MULTIPLE GRAPH RECORDER-ANNUNCIATOR

Filed Sept. 22, 1961

*INVENTORS*
WILLIAM E. VAN HORNE
GLENROY W. BARNETT
MARION FREDERICK GODDARD
BY *Philip M. Dunson*
ATTORNEY Sept. 22, 1964

W. E. VAN HORNE ETAL 3,149,900

MULTIPLE GRAPH RECORDER-ANNUNCIATOR

Filed Sept. 22, 1961

*INVENTORS.*
WILLIAM E. VAN HORNE
GLENROY W. BARNETT
BY MARION FREDERICK GODDARD

Philip M. Dunson

ATTORNEY

Sept. 22, 1964   W. E. VAN HORNE ETAL   3,149,900
MULTIPLE GRAPH RECORDER-ANNUNCIATOR
Filed Sept. 22, 1961                            11 Sheets-Sheet 7

INVENTORS
WILLIAM E. VAN HORNE
GLEN ROY W. BARNETT
MARION FREDERICK GODDARD
BY
ATTORNEY

Sept. 22, 1964   W. E. VAN HORNE ETAL   3,149,900
MULTIPLE GRAPH RECORDER-ANNUNCIATOR
Filed Sept. 22, 1961
11 Sheets-Sheet 8

INVENTORS
WILLIAM E. VAN HORNE
GLENROY W. BARNETT
MARION FREDERICK GODDARD
BY *Philip M. Dunson*
ATTORNEY Sept. 22, 1964    W. E. VAN HORNE ETAL    3,149,900
MULTIPLE GRAPH RECORDER-ANNUNCIATOR
Filed Sept. 22, 1961    11 Sheets-Sheet 11

INVENTORS
WILLIAM E. VAN HORNE
GLENROY W. BARNETT
MARION FREDERICK GODDARD
BY *Philip M. Dunson*
ATTORNEY United States Patent Office 3,149,900
Patented Sept. 22, 1964

3,149,900
MULTIPLE GRAPH RECORDER-ANNUNCIATOR
William E. Van Horne, Glenroy W. Barnett, and Marion Frederick Goddard, all of Columbus, Ohio, assignors to Keinath Instrument Company, Columbus, Ohio, a corporation of Ohio
Filed Sept. 22, 1961, Ser. No. 140,049
22 Claims. (Cl. 346—17)

This invention relates to recording apparatus. It has to do particularly with a multiple recorder-annunciator which measures, examines, and records, as coordinates, a number of variables on charts or graphs. In some of its aspects this invention is related to our copending applications Serial No. 115,182, filed June 6, 1961, and Serial No. 124,592, filed July 17, 1961, now United States Patent 3,090,001.

The first electrical recording instruments used direct-deflection techniques, which are still used extensively. Such recorders are fully satisfactory for applications where sufficient energy is available from the source and where long lead length is no problem.

The basic disadvantage of direct-deflection techniques is sensitivity to line resistance. This is overcome in null-balance indirect-type recorders in which a bridge is balanced and no current flows at the balance point. This type of recorder is in general use; recorders are available with "fast" response and high sensitivity (microvolt input).

The modern trend to multipoint recording brings out a basic disadvantage of the null-balance-type recorder. It is too slow. Further, overlapping recording of even 10 or more points causes a confusing pattern. Many times the curves criss-cross and it is difficult to separate one curve from another.

The result is increased emphasis on segmental recorders, in which segments of the chart are used for specific variables and the sweep-balance recording technique, in which completely electrical means are used to detect the magnitude of the electrical signal.

The multiple recorder-annunciator of this invention utilizes the sweep-balance principle in the measuring circuit. A sweep-balance measuring circuit is a true potentiometer circuit; that is a circuit in which an unknown is compared with a known millivoltage and, at the instant the two are equal, no current flows. In this invention, the chart-printer is mechanically geared to a voltage divider on which a reference voltage is developed which is exactly proportional to the position of the printer on the recording chart. The printer is driven at constant speed, sweeping over all chart frames. The voltage divider makes one complete revolution for each chart frame swept. At the instant during the sweep that a null condition exists in the potentiometer circuit, a mark is printed on the chart. This cycle is repeated continuously with the marks slowly displaced in the time direction so that a continuous line is formed.

The apparatus of this invention records on a sheet of paper which has been preprinted (to specification) with a series of chart frames. Preferably the larger charts are slit in two for convenience in handling. These sheets are mounted on a translucent platen, or printing surface, and mechanically stretched and clamped to insure dimensional stability, unaltered by humidity. Recordings are made by a master print-bar which contains solenoid-actuated print-hammers and ink impregnated ribbons. The print-bar scans from top to bottom and return, printing a dot in each frame on each sweep. Preferably the normal sweep period is ten seconds down and ten seconds back, and printing may take place in both directions. The invention includes multi-color recorders where one color is printed during the downward sweep, another on the upward sweep. In single color units, printing alternates between adjacent rows upon reversal of direction. The printers are slowly displaced in the time direciton so that successive dots form a continuous-line trace.

Preferably the platen is translucent, and back-lighted, so that light comes through the paper. Colored acetate symbols or color-blocks may be applied to color-code the various chart frames, or for other purposes. Annunciator alarm lights may be mounted immediately behind the appropriate chart frames so that high-intensity light spots are projected through the paper to signify alarm conditions.

This invention has a number of advantages and improvements over conventional or previously known recorders. More information is recorded in one small area, on one sheet of paper, in front of one observer. As an example, 400 variables may be recorded on 100 separate chart frames in four colors. Each chart frame may have an independent calibration. There is a common time scale between all chart frames making it easy to cross-correlate between all recorded quantities. All process records are on one or two sheets of paper so that records are more conveniently usable after the chart has been removed from the instrument, as, for example, compared to strip charts. All records are in chart-trace form so that it is easy to see trends, easy to see upsets, and easy to compare adjacent rows of charts. Both electrical and pneumatic variables may be recorded on one chart. The annunciator includes alarm lights projected through the rear of the chart at the precise location where the off-normal variable is recorded so that no ambiguity is possible. The multiple recorder-annunciator provides low cost per recorded point.

Figure 1:
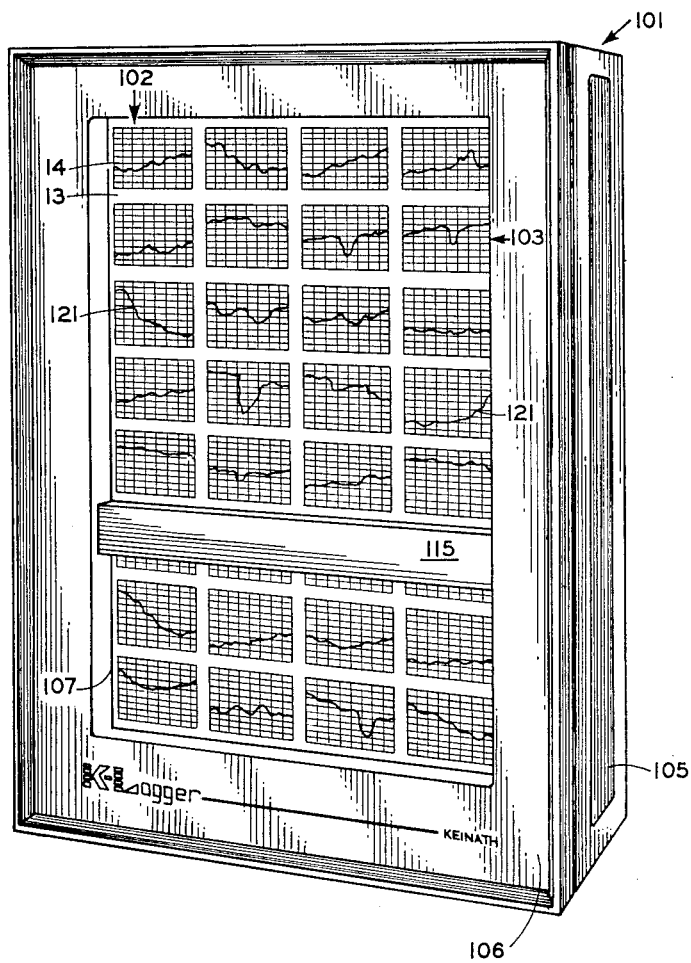
FIG. 1 is a perspective view showing the front of the recorder.
Figure 2:
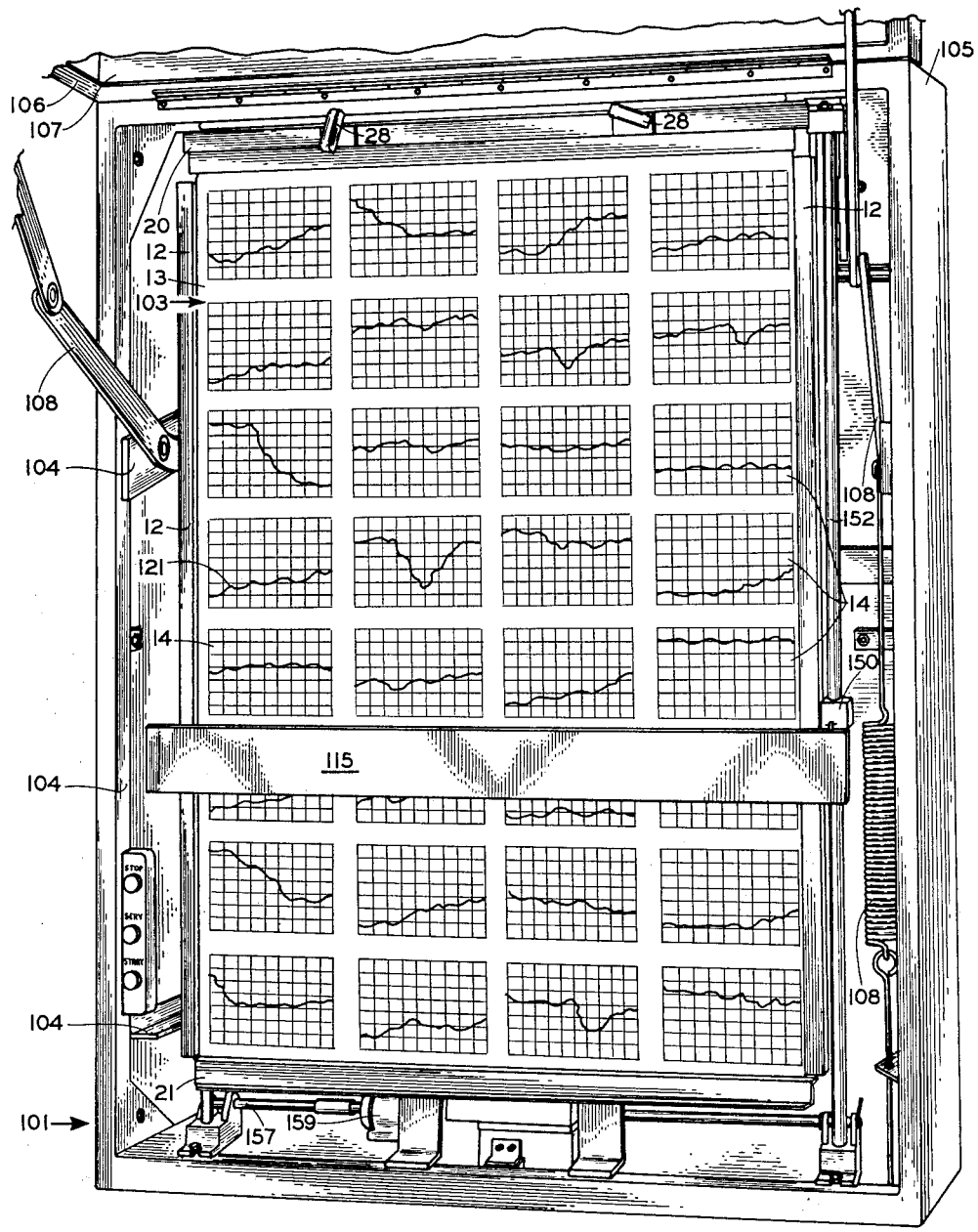
FIG. 2 is a perspective view of the recorder with the front door opened.
Figure 3:
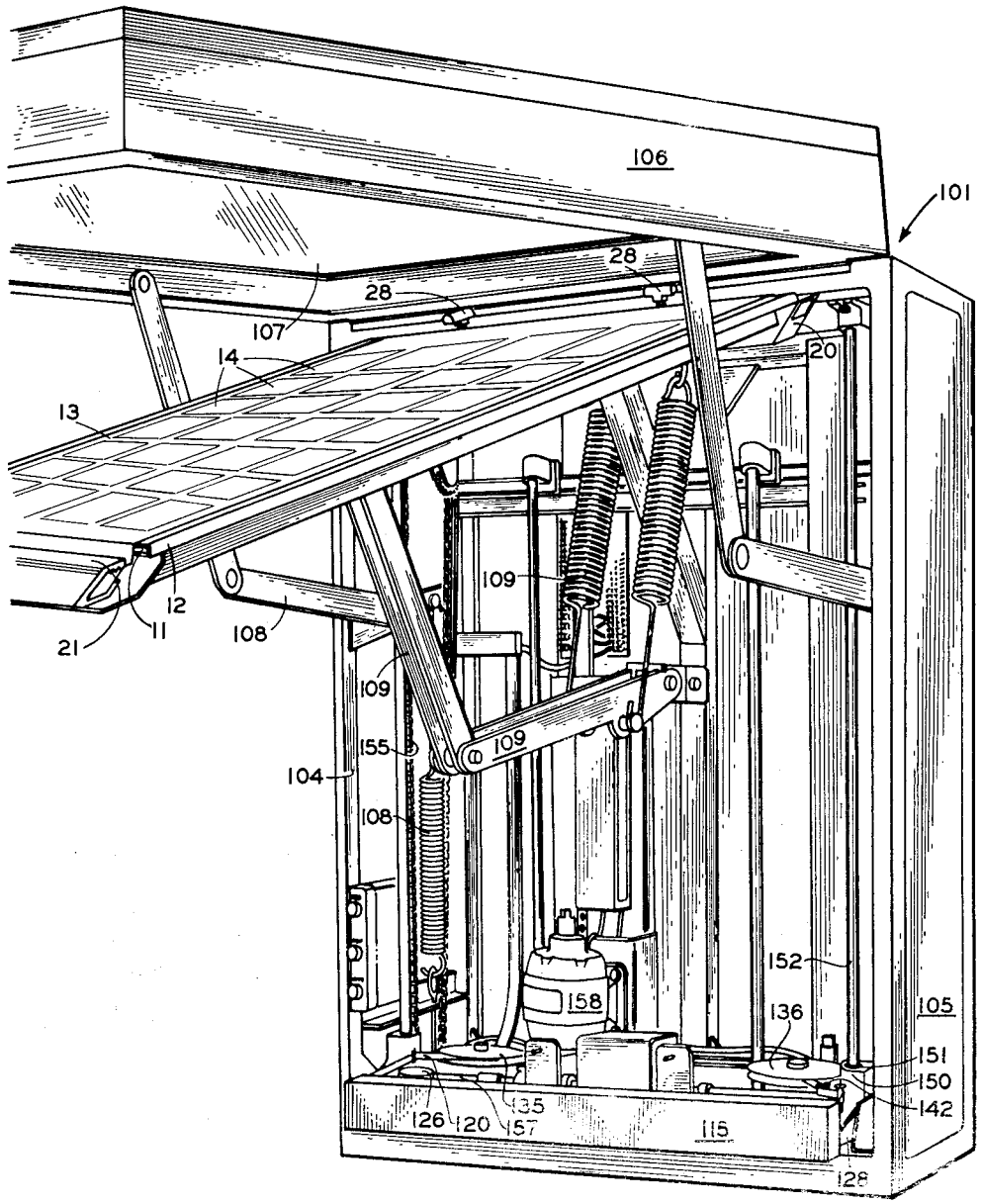
FIG. 3 is a perspective view of the recorder with both the front door and the chart platen opened.

Referring to FIGS. 1, 2, and 3, the recorder 101 is a unit which records a number of variables on a sheet of paper 13 which has been printed with a number of strip chart-frames 14—14 arranged in columns 102 and row 103. Each of the chart-frames 14—14 can be considered equivalent to a separate recording instrument and can have a calibration which is completely independent of any other. Hence, a single recorder can accept inputs from thermocouples, pressure transducers, flow transmitters, tachometers, strain-gauges, etc.

The recorder 101 is built in a frame 104. The parts of the equipment mount to this frame 104. The "skin" of the housing 105 is preferably made up of shallow pans, which bolt to the frame 104 with gasketed joints.

The front door 106 of the recorder 101 includes transparent material 107 such as glass. It is hinged at the top, and counter-balanced by spring-loaded lever operators 108—108 at both sides. The levers 108—108 are designed in such a way that they hold the door 106 closed against its gasket until the door is lifted so that the levers 108—108 pass their "dead center" position. From this point upward, they lift the door 106 and hold it open.

The paper 13 upon which the recording is made is one large sheet upon which are printed chart-frames 14. On wide recorders, the chart is preferably slit vertically down the center to make two pieces for ease in handling. Since paper is hygroscopic and tries to shrink or grow with changes in humidity, it must be stretched and clamped into place, so that the most extreme humidity changes cannot change the dimensions in the slightest in the direction of the ordinates of the graphs. To make this possible, a good grade of map paper is preferably used and the "grain" of the paper 13 is oriented horizontally in the recorder 101 so that the stretch is applied "cross-grain."

The platen 11, or printing surface against which the paper 13 is held, provides the solid backing required for recording. It is made up of a heavy transparent material preferably glass sheet mounted on a steel frame 12. At both top and bottom are paper holding and positioning mechanisms 20 and 21 which are used to clamp and stretch the chart paper 13. The whole platen 11 is hinged at the top with spring-loaded lever operators 109 similar to the operators 108 on the outer door 106; the platen 11 likewise can be lifted for access to the interior of the recorder 101.

Since the platen 11 is translucent, lights mounted inside the recorder cabinet show through both platen 11 and paper 13. At all four corners of the platen 11 are fine scribe-marks which act as guide lines 15 for positioning the recording chart. To apply a chart 13 to the recorder 101, the thumbscrews 28 and 28' at both top 20 and bottom 21 are turned until the clamp jaws 29, 29' 30 and 30' open. Then the chart paper 13 is slipped between the open jaws 29, 29', 30 and 30' at both top and bottom and roughly positioned. Starting at the top, the thumbscrews 26' are turned until the clamp 20 closes on the paper 13. Next the thumbscrews 26' at the bottom are turned until the bottom clamp 21 also closes. The light coming through the platen 11 and paper 13 from the rear show clearly on the platen 11. It is now a simple matter to bring the chart 13 into precise alignment with these marks 15 by using the thumbscrews 26 and 26' as vernier adjustments.

It will be noted that the same thumbscrews 26 and 26' in the paper holding and positioning mechanisms 20 and 21 first cause the clamp to close, then after the clamp closes tightly, stretch the paper 13. When the paper 13 is finally stretched into position, it will be noticed that the paper 13 itself is under quite high tension which holds it tightly against the flat platen 11. As the humidity changes, this tension will increase or decrease and the paper 13 will attempt to shrink or grow. However, it cannot do so since it is firmly held to the required dimension and the clamps will not let it shrink; likewise the amount of pre-stretch in the paper 13 is more than enough so that even under the most extreme humidity conditions, it cannot grow to such an extent that it gets "baggy."

Figure 4:
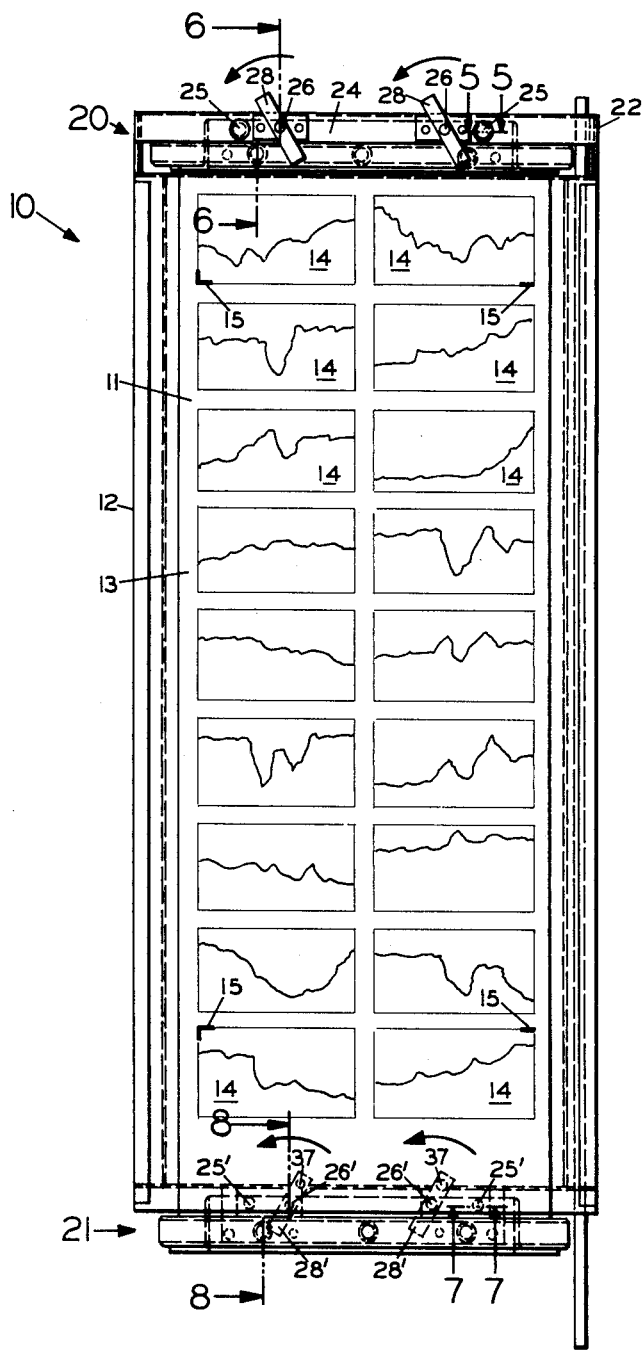
FIG. 4 is a front plan view of typical holding and positioning apparatus according to the present invention.

Referring to FIGS. 4–8, typical holding and positioning apparatus 10 according to the present invention comprises a platen 11 held by a framework 12. The platen 11 is made of transparent or translucent material such as a heavy rigid plastic sheet, and the frame 12 is made of any suitably strong material such as steel. The platen 11 provides a solid backing for a sheet of paper 13 which may have chart frames 14—14 printed or otherwise marked thereon. Typical chart frames 14 are rectangular as shown in FIG. 4 and may have therein coordinate markings such as rectangular, semilog, log-log, square root, or any other desired coordinates or markings. Scribe marks or guide lines 15—15 are provided on the platen 11. Preferably one guide line 15 is provided near each corner of the platen 11, each guide line 15 coinciding with the proper position for a similar line on the paper 13, such as a line defining a chart frame as shown in FIG. 4.

The top and bottom ends of the frame work 12 include paper holding and positioning mechanisms 20, 21, respectively. In the top mechanism 20, a stationary frame member or housing 22, which is fixedly attached to the platen 11, provides a housing and mounting for most of the other components of the top mechanism 20. A right angled support member 23, which extends substantially the width of the top mechanism 20 has rigidly affixed thereto a guide member 24 which is slidably mounted by means of holes therein on a plurality of guide pins 25, which are rigidly mounted on the housing 22. The position of the guide member 24 is controlled through threaded holes, one near each end of the guide member 24, by means of thumbscrews 26, each of which is rotatably mounted on the housing 22 through a thrust bearing 27. Each thumbscrew 26 is manually controlled by a handle 28.

Figure 6:
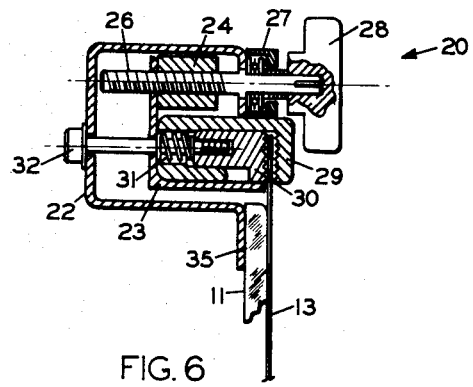
FIG. 6 is a sectional view taken on the plane 6—6 of FIG. 4.

Also fixedly attached to the angle support 33 is an outer clamp jaw 29. An inner clamp jaw 30 is slidably mounted in the outer clamp jaw 29. A strong compression spring 31 normally presses the clamp jaws 29, 30 tightly together holding the paper 13 firmly between their two clamping edges. The forwardmost position of the inner clamp jaw 30 is limited however by a shoulder screw 32 to which the inner clamp jaw 30 is fixedly threaded. In FIG. 6, the inner clamp jaw 30 is shown in its forwardmost position as limited by the shoulder screw 32, while the outer clamp jaw 29 has been moved forward by the thumbscrew 26 far enough to provide space for inserting the paper 13 between it and the inner clamp jaw 30.

After the paper has been inserted between the clamp jaws 29, 30, the handle 28 of the thumbscrew 26 is turned so as to move the outer clamp jaw 29 back against the inner clamp jaw 30. The inner clamp jaw 30 remains pressed forward by the spring 31 to its forwardmost position as shown in FIG. 6 until the outer clamp jaw 29 is firmly pressed against the paper 13 and the inner clamp jaw 30, and further turning of the handle 28 in the same direction moves everything mounted on the angle support 23, including the inner upper end of the clamp jaw 30 and the shoulder screw 32, back, pulling the paper 13 to its desired position.

Figure 7:
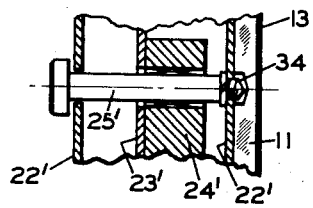
FIG. 7 is a sectional view taken on the plane 7—7 of FIG. 4.
Figure 8:
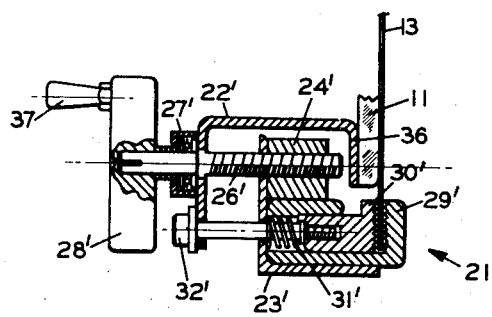
FIG. 8 is a sectional view taken on the plane 8—8 of FIG. 4.

The bottom paper holding and positioning mechanism 21 may be identical to the top mechanism 20 (turned upside down, of course), and in some equipment it would be preferred that the top and bottom mechanisms 20, 21 be identical, because of savings in the cost of manufacture. Where it is preferred that the mechanism not extend any farther beyond or in front of the platen than is necessary, however, and where it is possible to control the mechanism from behind, the arrangement shown in the drawings, especially FIGS. 7 and 8, is preferable.

Figure 5:
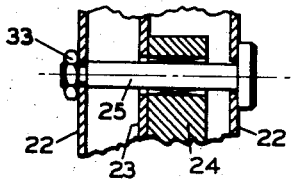
FIG. 5 is a sectional view taken on the plane 5—5 of FIG. 4.

The bottom mechanism 21 is essentially the same as the top mechanism 20. The components 22'–32' of the bottom mechanism 21 are identical to those of the top mechanism 20 having the same reference numerals without primes, except for a few minor differences mentioned below. Each guide pin 25 of the top mechanism 20 is conveniently held in place by a nut 33 as indicated in FIG. 5, while each guide pin 25' in the bottom mechanism 21 is more conveniently held in place by a threaded connection to the housing 22' as indicated at 34 in FIG. 7. The housing 22 of the top mechanism 20 is connected at its lower end to the platen 11 as is indicated at 35 in FIG. 6, while the housing 22' of the bottom mechanism 21 is connected at its upper end to the platen 11 as is indicated at 36 in FIG. 8. The housing 22' of the bottom mechanism 21 differs from the housing 22 of the top mechanism 20 in that the housing 22' is cut off just below the shoulder screw 32'. The thumbscrew 26' is mounted in the housing 22' so as to extend toward the back of the bottom mechanism 21 as shown in FIG. 8, rather than to the front as in the top mechanism 20 shown in FIG. 6. For convenience in reaching and turning the handles 28' in the bottom mechanism 21, a knob 37 preferably is provided on each handle 28'. While the angle support 23' and the guide member 24' of the bottom mechanism 21 are mounted in the same positions as are the angle support 23 and guide member 24 of the top mechanism 20 (as is apparent from FIG. 8 and FIG. 6), the clamp jaws 29', 30' are positioned in the bottom mechanism 21 in the position that is upside down as compared to the position of the clamps 29, 30 of the top mechanism 20, so that the opening between the clamp jaws 29', 30' is in the upward direction to receive the paper 13. The operation of the bottom mechanism 21 is identical to that of the top mechanism 20, except that it is controlled from behind rather than from in front.

The paper holding and positioning apparatus 10 is employed in the following manner:

The paper 13, which preferably is a good grade of map paper, is placed roughly in position on the platen 11. The machine direction, or "grain," of the paper 13 is in the horizontal direction. The paper 13 is inherently stable in the machine direction, and need not be stressed in this direction; especially where, as in the typical apparatus described herein, the horizontal direction on the charts represents the independent variable, such as time. The charts 14—14 have been printed on the paper 13 in a predetermined manner such that portions of them will coincide with the guide lines 15—15 when the paper 13 is correctly positioned and sufficiently stretched. Lights (not shown) preferably are provided behind the platen 11 to facilitate lining up the appropriate markings on the paper 13 with the guide lines 15—15 on the platen 11, and to aid in reading the charts 14—14.

The thumbscrews 26, 26' of the top and bottom mechanisms 20, 21 are turned until the jaws of the clamps 29, 30 and 29', 30' open. The paper 13 is slipped between the open jaws at both top and bottom, and is roughly positioned relative to the guide lines 15—15. The thumbscrews 26 of the top mechanism 20 are turned by the handles 28 until the clamps 29, 30 close against the top end of the paper 13. The thumbscrews 26' of the bottom mechanism 21 are turned by the handles 28' until the clamps 29', 30' close against the bottom end of the paper 13. The thumbscrews 26, 26' are then further tightened and adjusted on both sides at both top and bottom, in any convenient order, until the paper is precisely positioned relative to the guide lines 15—15.

The same thumbscrews 26, 26' in the clamping and positioning mechanisms 20, 21 first cause the clamps 29, 30 and 29', 30' to close against the paper 13; and then after the paper 13 is tightly clamped, they stretch the paper 13. When the paper 13 is finally stretched into position, it is under very high tension, which holds it tight against the flat platen 11. As humidity changes, the tension increases and decreases, and the paper 13 would thus tend to shrink or expand. However, the paper 13 cannot shrink or expand, since it is firmly held to the proper dimension. The clamps 29, 30, 29', 30' do not permit the paper 13 to shrink, and the amount of prestretch they provide in the paper 13 is enough to assure that even under the most extreme conditions of humidity it cannot become loose, because it is stretched farther than it would ever expand of its own accord even under the most extreme conditions.

Figure 21:
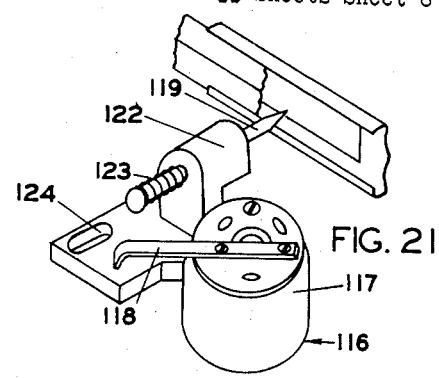
FIG. 21 is a perspective view of a printing mechanism according to the present invention.

The actual recording is done by means of a print-bar 115 which scans vertically across the paper 13. Inside this print-bar 115 (shown in FIG. 9) at each column location are printing mechanisms 116 (shown in FIG. 21) each consisting of a solenoid 117 that actuates a print-hammer 118. The hammer 118 strikes a printer 119 that acts like the "period" key on a typewriter and prints dots through an ink impregnated ribbon 120 such as a typewriter ribbon onto the chart 14. The dots are slowly displaced to the right with time to form continuous lines 121 (FIGS. 1 and 2) representing the recorded variables.

The solenoids 117—117 utilized are preferably rotary-type selected for extremely high speed of response and long life. The printers 119—119 are sharpened steel pins which slide through a small clearance hole bored in a guid block 122. The pins 119—119 are normally held away from the paper by a spring 123; to print the dot the printer 119 is driven against the ribbon 120 and paper 13 by a blow from an arm or hammer 118 mounted on the rotary solenoid 117. The guide block 122 is mounted with slotted holes 124—124 to allow precise adjustment of the printing point.

All solenoids 117—117 and hammers 118—118 are mounted on a single chassis 125 which is driven to the right by a single time drive motor 126. The chassis 125 slides on rods 127 which are fastened to the main frame 128 of the print-bar 115. The chassis 125 is pulled across by means of a fine cable 129 which is driven through a slip-clutch (not shown) and pulley 130 arrangement by a small synchronous motor 126 of the "chart-drive" type. The time drive motor 126 and clutch are mounted underneath the platen 11 on the main casting at the left end of the print-bar assembly 115.

A single ink impregnated ribbon 120 passes underneath all the printers 119—119 in the print-bar 115. A spool 135 containing a large supply of ribbon 120 is mounted at one end of the print-bar 115 and a similar take-up spool 136 is mounted at the opposite end of the print-bar 115. The ribbon 120 pays off over idler pulleys 137—137, passes through a guide channel 138 across the full length of the print-bar 115, and is taken up on the take-up spool 136. The ribbon is indexed ahead by means of a ratchet mechanism 139 which drives pinch rolls 142 and the take-up spool 136 each time the print-bar 115 makes one complete sweep up and back across the chart 13.

Figure 22:
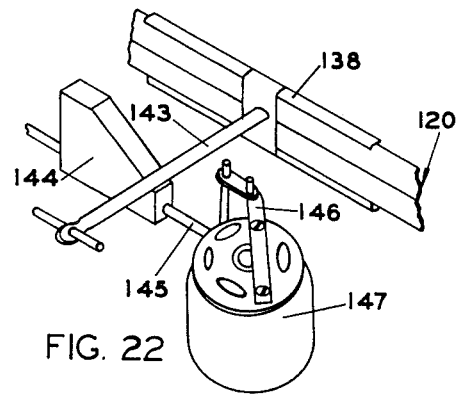
FIG. 22 is a perspective view of the mechanism for changing color on two color ink impregnated ribbon.

For multi-color recording, a two-color, or four-color ribbon 120 is used. The colors are changed by shifting the guide-channel 138 through which the ribbon 120 passes underneath the printers 119—119. This channel 138 is mounted to the chassis 125 by means of pivoted arms 143 (shown in FIG. 22). These arms 143 are lifted to the various positions by means of cam-blocks 144 which are mounted on a rod 145 actuated through a linkage 146 by a rotary solenoid 147 at one end of the print-bar 115. For a two-color unit, one of these solenoid 147 and cam-block 144 assemblies provides two positions for the ribbon guide channel 138. For three- and four-color operation, two of these assemblies are provided with a solenoid 147 at each end of the print-bar 115. This provides up to four positions as follows: Solenoid A and B out, solenoid A in B out, solenoid A out B in, solenoid A and B both in. Under normal sequencing, one sweep of the print-bar 115 over all chart-frames 14—14 is made with the ribbon 120 in one position, hence, recording in one color. At the end of that sweep, the ribbon 120 is shifted to the next color.

The frame of the print-bar 115 is a beam mounted on castings 150—150 at each end. The castings 150—150 contain bushings 151 which slide vertically on hardened and ground shafts 152. The shafts 152 extend from the top to the bottom of the recorder frame 104 and are held in rigid alignment by cast mounting blocks.

Figure 9:
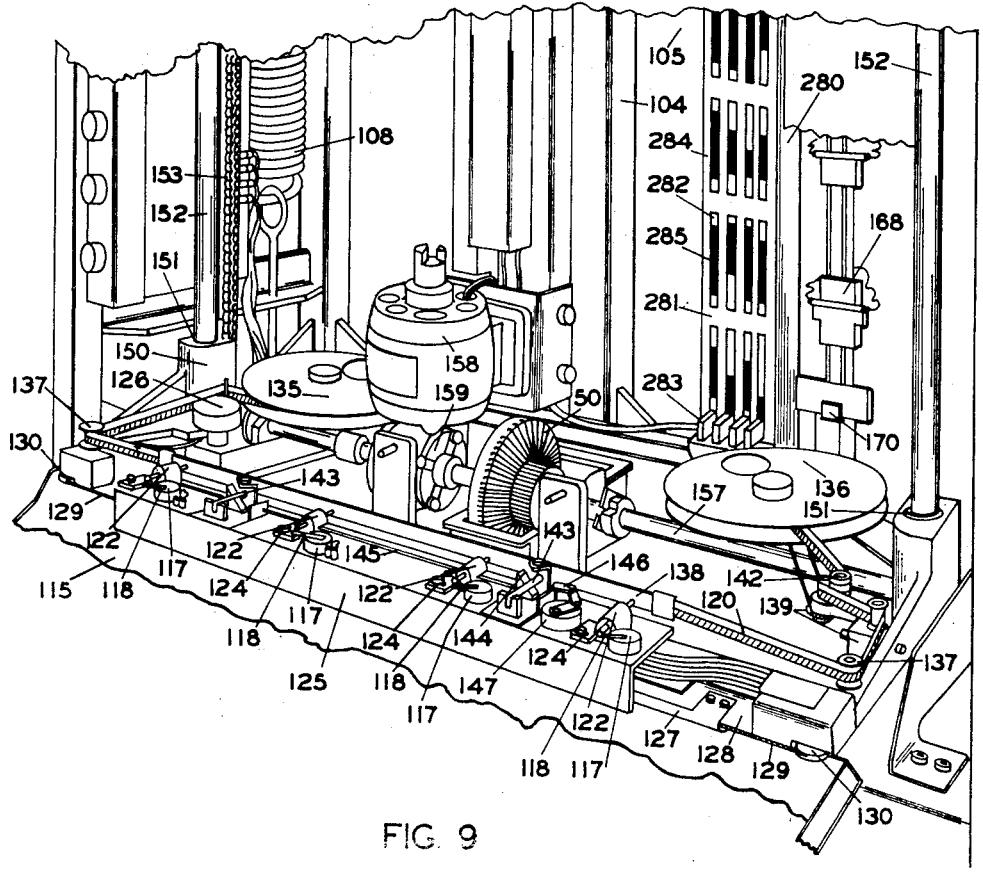
FIG. 9 is a perspective view of the mechanism that operates the print-bar.

The casting 150 at one end of the print-bar 115 (the left as shown in FIG. 9) carries with it the following units: the time drive motor 126, the time drive slip-clutch and pulley arrangement 131, and the ribbon supply spool 135. The casting 150 at the opposite end (shown at the right end in FIG. 9) carries the take-up spool 136 and the ratchet mechanism 139 which indexes ahead the ribbon 120.

A chain drive is provided to cause the print-bar 115 to scan across the chart 13. A separate chain 155 drives each casting 150; both chains 155—155 are driven by sprockets mounted at the bottom of the recorder cabinet on a common drive-shaft 157.

A continuous loop of chain 155 traveling in a vertical plane is mounted at each end of the print-bar 115. The print-bar casting 150 is clamped to its respective chain 155; the chain 155 is not broken at that point. A constant tension is maintained on the chain loop 155 by means of a spring loaded idler sprocket, (not shown) in the upper rear of each side of the recorder cabinet.

The main drive shaft 157 is driven by a motor 158 with integral worm gear reduction. Since the recorder 101 is a sweep-balance recorder, this motor 158 drives at practically constant speed as the print-bar 115 passes over the chart 13, and the motor 158 need not rapidly accelerate, decelerate, and reverse.

The commutator voltage divider 50 is mounted coaxially around the drive shaft 157. The brush arm 87 of the commutator 50 is pinned to the drive shaft 157 so that slippage is impossible. Hence, there is a precise position of the brush arm 87 on the commutator for every position of the driven shaft 157, and in turn for every position of the print-bar 115 in its sweep over the chart 13. The sprocket and chain ratio is such that the drive shaft 157 makes precisely one revolution as the print-bar 115 moves over the distance from the top of one chart-frame 14 to the top of the next. Hence, there is one point on the periphery of the commutator 50 corresponding precisely to each point across each chart-frame 14.

The measuring circuit of the recorder 101 may be either a potentiometer of classic configuration or a Wheatstone bridge, depending upon application. The potentiometer circuit will be used to measure voltage or currents, and the Wheatstone bridge to measure resistance.

Characteristic of either a potentiometer or a Wheatstone bridge circuit is the use of a precision voltage divider or "slide wire" which is mechanically linked to the indicator or recorder. The recorder 101 is no exception to this general rule. As was stated, there is a commutator type of voltage divider 50 mechanically linked to the travel of the print-bar 115 across the recording chart 13 so that there is a position on the periphery of the commutator 50 corresponding precisely to each point on the recording chart-frame 14.

Where it is desired to scan repeatedly over a range of voltages or impedances, scanning in a continuous manner generally is not feasible because the friction of the moving contact on the impedance element causes appreciable electrical noise and soon wears out the potentiometer or rheostat. For such purposes, therefore, it is customary to use stepwise scanning through the range of impedances or voltages by means of fixed contacts connected to spaced points on the impedance. The fixed contacts and the slidable contact can all be made of materials having high conductivity and good resistance to wear such as, for example, coin silver bars.

In a common form of such device the fixed contacts may be arranged in a circle as are the commutator segments in a motor or generator, and the sliding contact may be in the form of a brush such as is used in a motor or generator. Although the contacts connected to the impedance are referred to above as the fixed contacts, in rotating devices such as those mentioned above they would ordinarily be the contacts that move, and the brush would remain stationary. As far as the electrical circuit is concerned, however, it is immaterial which contact or contacts move, as long as there is relative sliding movement between them.

Because of various physical limitations and cost considerations, there is a practical limit to the number of taps that can be employed in stepwise electrical tapping devices. Where it is desired to divide a given voltage or impedance range into a large number of discrete steps it would be desirable in many cases to be able to provide more steps than the highest practical number of taps, or the highest practical number of commutator segments, whichever is the limiting factor. It is known that the number of steps can be made substantially twice the number of taps where an impedance is provided between each tap and its respective contact. In a voltage divider circuit of this type, when the movable contact bridges two adjacent fixed contacts the voltage on the movable contact is midway between that of each fixed contact where the impedances connecting the fixed contacts and their respective taps on the main impedance are equal.

It has been found in the present invention that by providing a plurality of movable contacts, properly staggered, the number of steps can be increased to at least substantially four times the number of taps. More specifically where two movable contacts are used, the number of steps is substantially four times the number of taps, where three are used the number of steps is substantially six times the number of taps, and similarly where more movable contacts are employed the number of steps is substantially twice the number of movable contacts times the number of taps.

Figure 10:
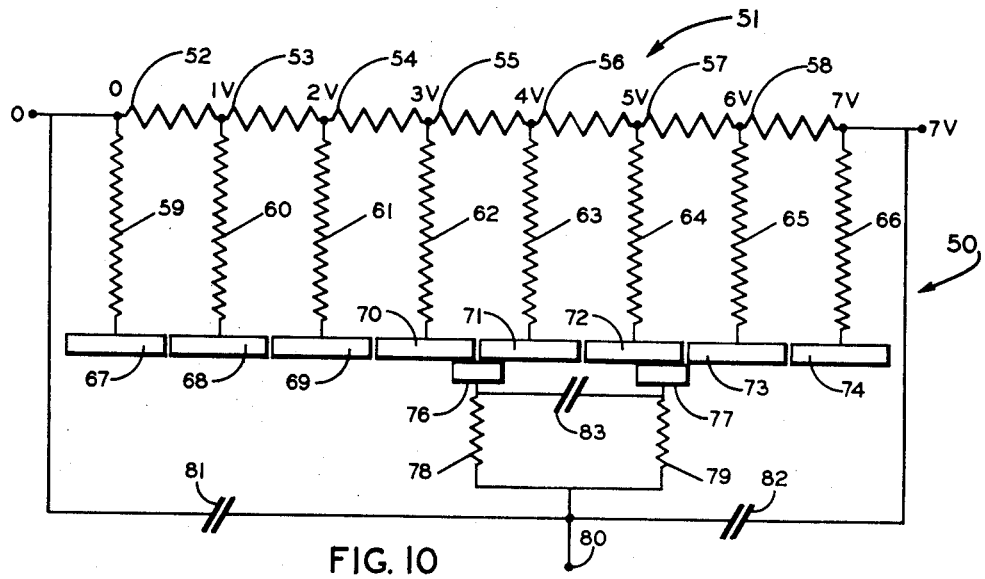
FIG. 10 is a schematic diagram illustrating a typical embodiment of a commutator according to the present invention.

FIG. 10 is a schematic diagram illustrating a typical embodiment of the voltage divider and FIGS. 11–19 illustrate various principles involved in the voltage divider 50.

Referring to FIG. 10, a typical electrical device 50 of the impedance and voltage divider type comprises a series impedance member 51 comprising the individual impedance segments 52–58. Where equally spaced essentially stepwise tapping is desired, the impedances 52–58 should all be equal. Connected to the ends of the impedance members 51 and to the junctions between successive segments 52–58 are a plurality of impedances 59–66 having impedances that are substantially equal to each other; and preferably substantially higher than the impedances of the segments 52–58, to avoid inequalities in the steps that might result if the impedances 59–66 were low enough relatively to provide a substantial reduction in the impedance between junctions of the impedance segments 52–58 during times when certain of the adjacent impedances 59–66 are connected together and thus shunt one or more of the segments 52–58. The opposite ends of the impedances 59–66 are connected respectively to electrical contacts 67–74.

The contacts 67–74 are all substantially equal in length and substantially equally spaced, preferably closely, from their adjacent contacts. Thus the distances between the corresponding ends of successive contacts 67–74 are substantially equal. The electrical contacts 67–74 are arranged so that together they form a contact surface such as a plane or preferably a cylindrical surface (which is most adaptable for use in the recorder 101) whereon a slidable contact can be positioned and moved lengthwise relative to the surface to contact at least one of the electrical contacts 67–74 at any position on the surface.

A pair of slidable contacts 76–77 are held, preferably with resilient means such as springs (not shown), at a fixed lengthwise spacing from each other along the contact surface 67–74; and are slidable relative to the surface in either direction. The length of each slidable contact member 76–77 is one-half the distance between the corresponding ends of successive contacts 67, 68; 68, 69; 69, 70; etc. The distance between the nearest edges of the slidable contacts 76, 77 is 1¼ times the distance between the corresponding ends of successive contacts 67, 68 etc.

One end of a coupling impedance 78 is connected to the slidable contact 76, and the other end is connected to a point 80. One end of a coupling impedance 79 is connected to the slidable contact 77, and the other end is connected to the point 80. One side of a capacitor 81 is connected to one end of the impedance member 51, and the other side is connected to the point 80. One side of a capacitor 82 is connected to the opposite end of the impedance member 51, and the other side is connected to the point 80. One side of a capacitor 83 is connected to the slidable contact 76, and the other side is connected to the slidable contact 77. For convenience in discussion it will be considered that a potential of seven volts is applied across the impedance member 51, and the voltage across each impedance segment 52–58 thus is one volt, the potentials at the various junctions being as indicated in FIG. 10, ignoring any slight loading effect from the brushes and associated impedances.

Figure 11:
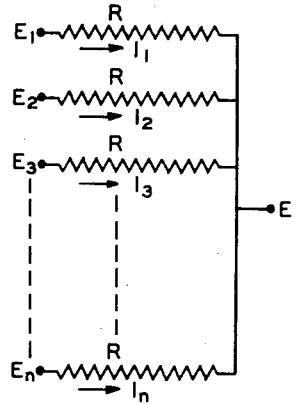
FIG. 11 is a schematic diagram illustrating one of the principles involved in the commutator.

To understand the operation of the voltage divider 50 it is helpful to consider the diagram of FIG. 11, wherein $E$, $E_1$, $E_2$, $E_3$ ... $E_n$ represent voltages (potentials), $I_1$, $I_2$, $I_3$, ... $I_n$ represent currents, and $R$ represents impedance, which for simplicity will be considered to be a pure resistance, the impedances of all of the elements shown in FIG. 11 being equal. From elementary theory it is apparent that $$E = E_1 - RI_1$$
$$= E_2 - RI_2$$
$$= E_3 - RI_3$$
$$\vdots$$
$$= E_n - RI_n$$

from which $$nE = E_1 + E_2 + E_3 + \ldots + E_n - R(I_1 + I_2 + I_3 + \ldots + I_n)$$

Where no current passes the point at E, $$I_1 + I_2 + I_3 + \ldots + I_n = 0$$

and $$nE = E_1 + E_2 + E_3 + \ldots + E_n$$

Thus the voltage $E$ is the arithmetic mean, or more loosely the "average," of the voltages $E_1$, $E_2$, $E_3$, ... $E_n$.

Figure 12:
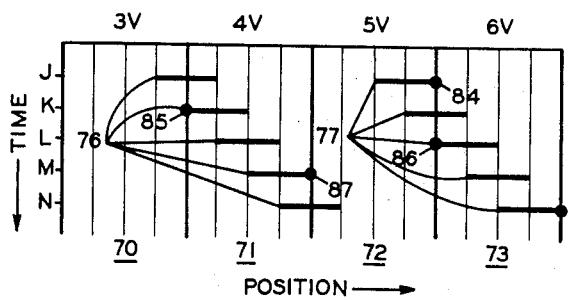
FIGS. 12–19 are semi-pictorial, schematic views, in the general nature of graphs, illustrating the principles of the staggered contacts in the commutator.

If current is drawn through the point at E, as is the case in some rheostat applications, the above equations do not apply exactly, and the voltage E is not precisely the arithmetic mean of the individual voltages; but it is very close thereto. As long as the impedances 59–66, 78, 79 are substantially larger than the impedances of the segments 52–58, the loading effect is small and any variation from the above equations is negligible.

Where essentially stepwise electrical tapping is desired, the capacitors 81–83 are omitted from the circuit of FIG. 10. Referring to FIGS. 10 and 12 the circuit of FIG. 10 without the capacitors 81–83 operates in accordance with the following explanation.

In FIG. 12 the heavy vertical lines represent the insulation or space between contacts in the contact surface, and the blank spaces between the heavy vertical lines represent the contacts 70, 71, 72, 73, which have the potentials 3 volts, 4 volts, 5 volts, and 6 volts, respectively, as indicated, when not shorted to an adjacent contact. The heavy horizontal lines represent the slidable contacts 76, 77, as indicated, at successive positions on the contacts 70–73. Considering the contacts 76, 77 to be moving uniformly to the right, with time indicated in the vertical direction and increasing as one reads down on the diagram, it is seen that just before time J the contact 76 was at a potential of 3.5 volts, the contact 77 was at a potential of 5 volts, and the point 80 thus was at a potential of 4.25 volts, the arithmetic mean between the voltages at the contacts 76, 77.

At time J the contact 77 makes connection with the contact 73 as well as the contact 72, as is indicated by the heavy dot 84. This raises the potential at the contact 77 to 5.5 volts, and the potential at the point 80 thus is raised to 4.5 volts, since the contact 76 is still at the same potential as it had just before the time J. At time K the contact 77 remains at the same potential, 5.5 volts, but the contact 76 breaks its connection with the contact 70, as is indicated by the heavy dot 85, and thus its potential is increased to 4 volts, and the potential of the point 80 is increased to 4.75 volts. Similarly at time L, with the potential of the contact 76 remaining the same, the potential at the contact 77 increases one-half volt as it breaks connection with the contact 72, as is indicated by the heavy dot 86, and the voltage at the point 80 is increased one-fourth volt to the new potential of 5 volts. In like manner, with the potential of the contact 77 remaining the same, the contact 76 at time M makes connection with the contact 72, as is indicated by the heavy dot 87, raising its potential by one-half volt and the potential of the point 80 by one-fourth volt. Finally, at time N the potential at the point 80 is raised another one-fourth volt in similar manner, so that it is now at a potential one volt greater than its potential at time J, the contacts 76, 77 being in the same corresponding positions as they were at time J, but each at a one volt higher potential.

From FIGS. 10 and 12 and the above discussion, it is apparent that as the contacts 76, 77 move together one-fourth the distance between the corresponding ends of successive contacts 67–74, one of the contacts 76, 77 either makes or breaks a connection, and thus changes its potential by one-half volt and the potential of the point 80 by one-fourth volt. The action is the same in either direction.

Figure 13:
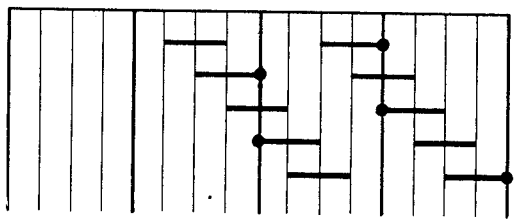

In FIG. 13, which is the same type of diagram as FIG. 12, with legends and reference numerals omitted for convenience, it is apparent that the same action takes place. In every movement of one-fourth the distance between corresponding ends of successive contacts 67–74 the contacts 76, 77 take turns making or breaking a connection, thus raising one of the individual voltages one-half volt, and the average voltage, at the point 80, one-fourth volt. In FIG. 13 the spacing between the contacts 76, 77 is three-fourths the distance between the corresponding ends of successive contacts 67–74. The action is similar for any spacing of an odd number of quarters of the distance between the corresponding ends of successive contacts 67–74. The spacing must be at least three-fourths of that distance, however. Otherwise three successive contacts 67–74 would be shorted at the wrong time in some positions, and this would provide a conflicting action. In other words, the distance between the contacts 76, 77 may be ¾, 5/4, 7/4, 9/4, or any higher odd number of fourths of the distance between the corresponding ends of successive contacts 67–74. The lengths of the contacts 76, 77 may be increased to 3/2, 5/2, 7/2, or any odd number of halves of the distance between the corresponding ends of successive contacts 67–74; since the action is the same as that described and illustrated in FIGS. 12 and 13, except that the longer contacts short out one or more of the contacts 67–74 in addition to those as indicated in FIGS. 12 and 13.

The alternate making and breaking of connections with every movement of one-fourth the distance between the corresponding ends of successive contacts 67–74 still takes place, however, in the same manner as illustrated in FIGS. 12 and 13.

For three or more slidable contacts the spacing principle is the same, and may be generalized by stating that successive slidable contacts are spaced any number of halves times the distance between the corresponding ends of successive contacts 67–74 plus an equally spaced or even staggering over such a half distance. In the case of three contacts, the closest spacing is two-thirds of the distance between the corresponding ends of successive contacts 67–74. Stated differently, this is one-half the aforementioned distance plus one-sixth of that distance; or still differently, one-half the distance plus ⅓ of ½. This spacing is illustrated in FIG. 15.

Figure 15:
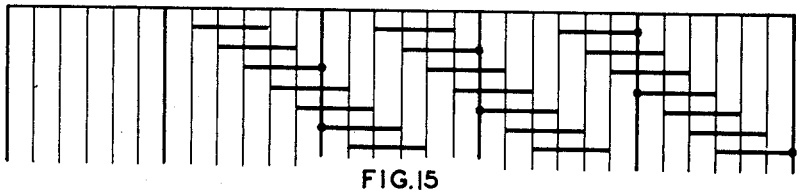

From FIG. 15 it is apparent that every ⅙ distance of movement across a contact 67–74 causes one of the slidable contacts to make or break a connection, and that the contacts take turns so that in every half distance of movement each has made or broken a connection. In the next half distance of movement each slidable contact successively makes or breaks (the opposite of what it did in the first half distance of movement); bringing the slidable contacts back to the same corresponding position as before the movement, but with each moved over the length of one contact 67–74.

Figure 14:
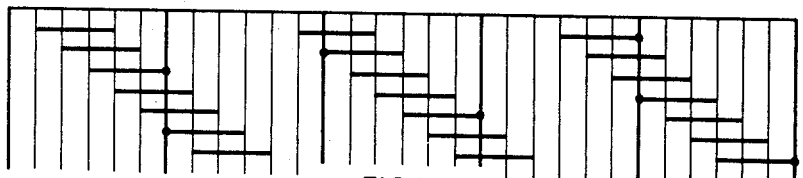
Figure 16:
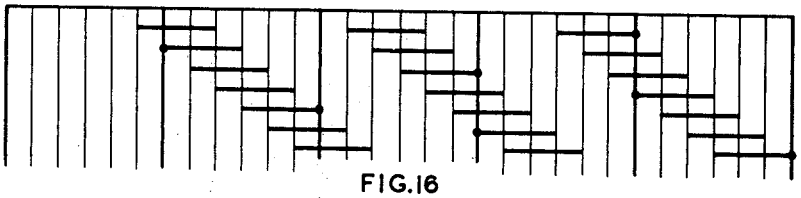

FIGS. 14 and 16 illustrate other convenient spacings for three slidable contacts. In FIG. 14 the spacing is 1⅙ of the distance between the corresponding ends of successive contacts 67–74; and in FIG. 16 the spacing is ⅚ of the aforementioned distance, which is ½ plus ⅔ of ½. The staggering is equal in this case also because with the middle contact spaced from the right-hand contact by ½ plus ⅔ of ½, and the left-hand contact spaced from the middle contact by the same distance, the spacing between the left-hand contact and the right-hand contact thus is ½ plus ⅓ of ½.

Figure 17:
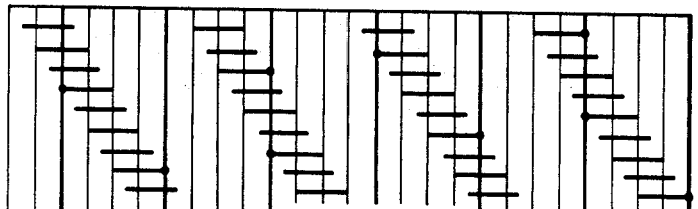
Figure 18:
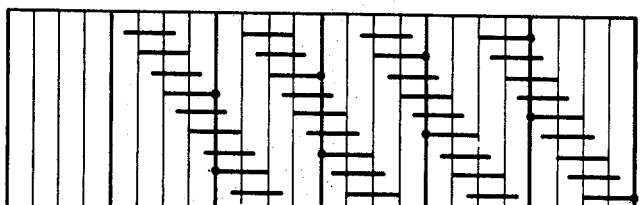
Figure 19:
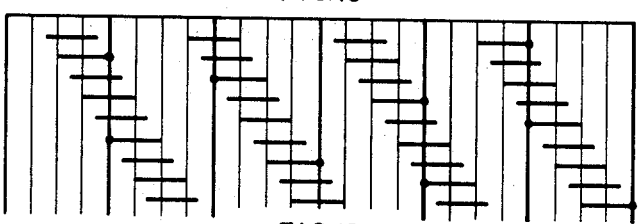

FIGS. 17–19 illustrate similar action where four slidable contacts are employed. Here the spacing between successive slidable contacts is any number of halves of the distance between the corresponding ends of successive contacts 67–74 and fourths of that half distance such that the slidable contacts are staggered from the others by ¼ and ½ of the half distance. In FIG. 17 the spacing is 1⅛ of the distance between the corresponding ends of successive contacts 67–74; in FIG. 18 the spacing is ⅝ of the aforementioned distance; and in FIG. 19 the spacing is ⅞ of the aforementioned distance. From FIGS 17–19 it is apparent that these spacings provide uniform or even staggering such that for every movement of ⅛ (¼ of ½) the distance between the corresponding ends of successive contacts 67–74 the slidable contacts take turns making and breaking connections, changing one of the four potentials by ½ volt, and the average potential by ⅛ volt.

To generalize, for any number of slidable contacts, the length of the contacting surface of each slidable contact member in the lengthwise slidable direction is equal to an odd integral multiple of one-half the distance along the lengthwise slidable direction between the corresponding ends of successive contacts 67–74, and then the distance in the lengthwise slidable direction between the nearest edges of successive slidable contacts is equal to an integral multiple of one-half the distance along the lengthwise slidable direction between the corresponding ends of successive contacts 67–74 plus a fraction of said half distance, wherein the denominator of the fraction is the number of said slidable contacts and the numerator is an integer such that the sum of any said numerator plus any at least one other said numerator equals an integer different from the denominator and any multiple thereof. The above generalization is intended to indicate in more precise terms what is meant by the equally spaced or even staggering within a half distance, as discussed above.

Referring back to FIG. 10, where it is desired to approach a continuous voltage change rather than a stepwise change, the capacitors 81 and 82, connected between the point 80 and the ends of, or any other desired points on, the impedance member 51, may be included in the circuit. The voltage across a capacitor cannot change instantaneously. It can change only gradually according to an exponential function, at a rate dependent upon the capacitance and other circuit values affecting the "time constant." The values of the capacitances 81, 82 can be chosen such that the time constants for the various positions of the slidable contacts 76, 77 provide a fairly smooth, rather than a stepwise, change of voltage at the normal operating speed of the slidable contacts 76, 77.

Still further smoothing of the voltage at the point 80 as a function of position of the contacts 76, 77 moving at their normal speed can be provided by including also the capacitor 83 connected between the slidable contacts 76, 77 (and with additional capacitors between other pairs of contacts where more than two slidable contacts are employed), since the capacitor 83 similarly causes the potential between the contacts 76, 77 to change gradually rather than instantaneously when one of the contacts 76, 77 makes or breaks a connection. The capacitor 83 should not be used between any contacts that are spaced less than the distance between the corresponding ends of successive contacts 67–74, because shorting of the capacitors at certain positions would result in arcing.

Where it is desired that the stepwise tapping, or the smoothed tapping with the capacitors added, is to be directly proportional to the position of the slidable contacts (or as a function of time where the slidable contacts are moved at a uniform speed) the impedances of the segments 52–58 should be equal and the staggering of the slidable contacts should be even, as discussed above. Where it is desired to obtain a different function of voltage or impedance, either in a stepwise or a substantially continuous manner, the impedances of the segments 52–58 may be made unequal in a predetermined manner or the staggering of the slidable contacts may differ from that specified above, or both. Such variations are considered to be within the scope of this invention, but are too numerous to be discussed individually. The impedances 59–66 could even be made unequal in a predetermined manner to provide certain functions, as could the impedances 78, 79, and other coupling impedances where more than two slidable contacts are employed. Ordinarily the impedance segments 52–58, the impedances 59–66 and the coupling impedances 78, 79 would be substantially pure resistances, especially in direct current circuits, but other types of impedance could be employed where desired. For convenience, only seven impedance segments 52–58 are shown in FIG. 10. In practice, a hundred or more such impedance segments are more typical. Any desired number, of course, may be used.

The foregoing description of the commutator 50 indicates a construction and method used to provide variable voltages or currents within the recorder that are known, for comparison to various unknown voltages or currents outside the recorder (or known and unknown resistances). The distance increments on the ordinate of the chart frames 14 correspond to increments of the voltage provided by the commutator 50 since, as the voltage is changed by movements of the commutator 50, the print-bar 115 is moving over the chart 13. The voltage is varied from minimum to maximum (by a complete revolution of the commutator 50) each time the print-bar 115 passes over a chart-frame 14. Since each chart-frame 14 can have a plurality of variables recorded thereon, each in a different color, and there are a number of columns 102 and rows 103 of the chart-frames 14—14, there must be means for insuring that they are recorded on the proper chart-frame.

In the embodiment of the recorder 101 shown in FIG. 2, there are four vertical columns 102—102 and eight horizontal rows 103—103. The print-bar 115 supports one printing mechanism 116 for each column 102 (four printing mechanisms 116—116 in all) so that one printing mechanism 116 prints the curves 121—121 for the eight chart-frames 14—14 in its own particular column 102. Thirty-two variables are recorded using a single color for printing, sixty-four variables with two colors, one hundred and twenty-eight with four colors, etc.

Assuming that one color of printing is to be used and thirty-two variables to be recorded and that the print-bar 115 is started at the bottom of the chart 13, on the first upward sweep of the print-bar 115, the chart-frames 14—14 in the first left hand column 102 are printed. The commutator 50 makes eight revolutions corresponding to the eight chart-frames 14—14 in the first left hand column 102. On the return or downward sweep of the print-bar 115, the chart-frames 14—14 in the second column 102 from the left are printed with the commutator 50 again making eight revolutions corresponding to the eight chart-frames 14—14. In like manner the chart-frames 14—14 of the third column 102 are printed on the next upward sweep of the print-bar 115 and the chart-frames 14—14 of the fourth column 102 are printed on the following return or downward sweep of the print-bar 115. The number of sweeps of the print-bar 115 necessary to cover all the chart-frame 14—14 corresponds to the number of columns 102—102. The total number of commutator revolutions corresponds to the number of chart-frames 14—14.

In two-color printing the numbers of variables, print-bar sweeps, and commutator revolutions are doubled. In three-color printing these numbers are tripled, in four-color printing, quadrupled, etc.

The reference signal of the commutator 50 and each input signal must be properly matched and, on null detection, provided to the proper printing mechanism 116 when it has arrived at the chart-frame 14 upon which the particular input signal is to be recorded.

The scanning switching of the multiple input signals to the recorder 101 is done in a uniquely trouble-free manner. As the recorder 101 switches from point to point, a total of four functions must be switched: (1) and (2) both sides of the input signal, (3) the zero suppression of the particular range appropriate for that variable, and (4) the span of that measuring range. These four functions can be switched by "pulling in" at the appropriate time 3 single pole, single throw switch contacts. In the recorder 101, these switch contacts are magnetic reed switches of a type recently developed by Bell Telephone Laboratories. These magnetic reeds are sealed in glass capsules in an inert gas atmosphere and the switch contacts themselves are of a gold alloy. The resulting switches have been tested through billions of operations without failure and are unique in low noise dependability.

Figure 20:
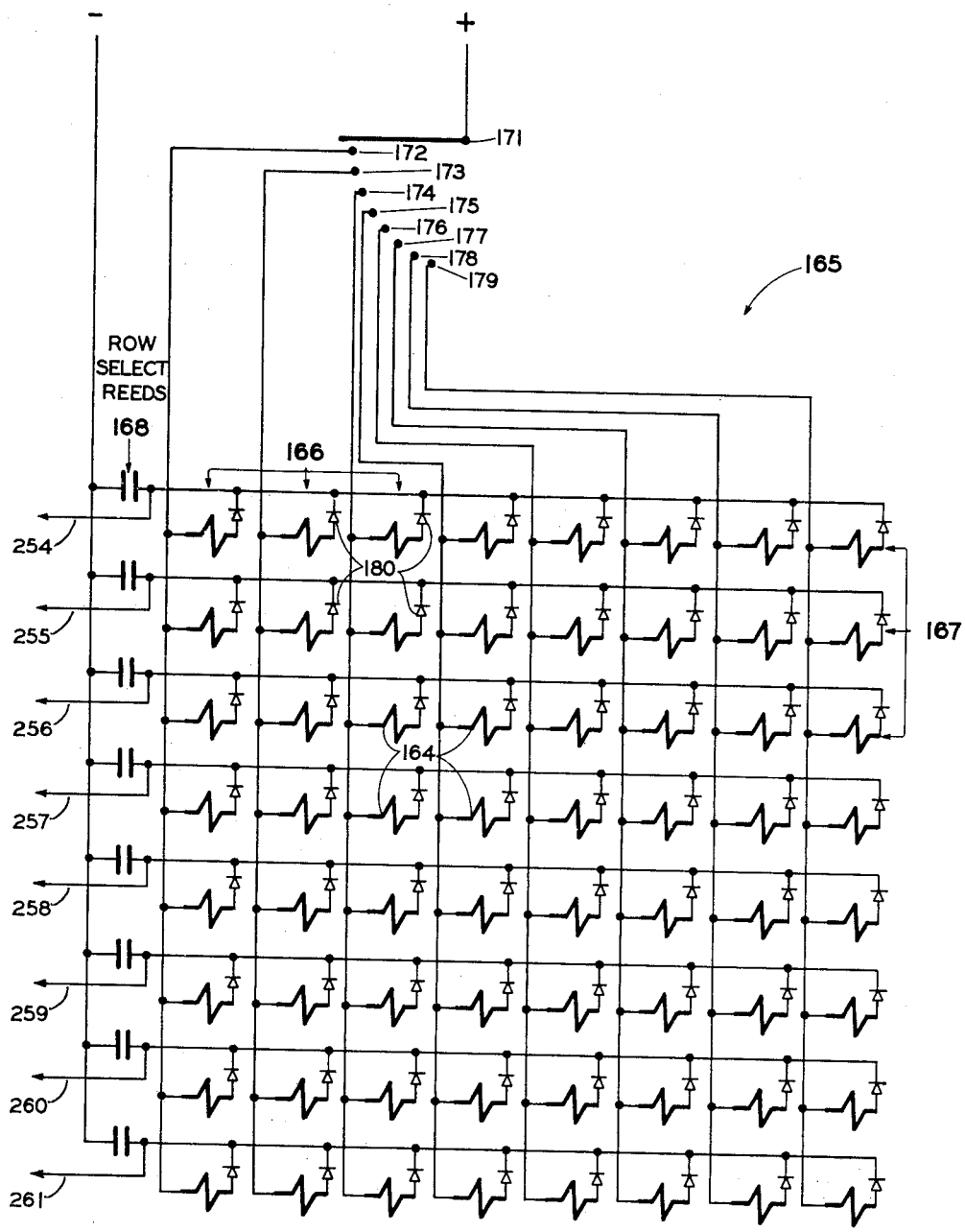
FIG. 20 is a schematic diagram illustrating the relay matrix for controlling row and column selection by the print-bar.

Referring to FIG. 20, the signal relays 164—164 are layed out in a matrix 165 in columns 166—166 and rows 167—167 exactly analogous to the layout of chart-frames 14—14 on the recorder chart 13. If FIG. 20 is compared to the chart 13 of FIG. 2, however, it is noted that there are twice as many columns 166—166 of signal relays 164—164 as there are columns 102—102 of chart-frames 14—14. Therefore, the example of the signal selector matrix 165 shown in FIG. 20 may be used for two-color printing on a thirty-two chart-frame chart corresponding to the example shown in FIG. 2. The same matrix could also be used for single color printing on an eight-column, eight-row chart.

One side of all the relay coils of the signal relays 164—164 in a horizontal row 167 are connected together and the other side of all the coils in a vertical column 166 are likewise connected together. When voltage is applied between the common lead from a horizontal row 167 and the common lead from a vertical column 166, this voltage appears across the one coil which lies at the intersection of the particular row 167 and column 166 selected. This, then, is the one coil actuated at that instant.

At any instant the variable being measured by the recorder 101 must obviously lie in the horizontal row 103 then being swept by the print-bar 115. In order to insure that this is always the case, the row selector 168 is a magnetic reed switch 169 (shown in FIG. 9) physically mounted inside the recorder 101 behind the particular row 103 involved. A magnet 170 is mounted on the print-bar frame 128 in such a position that it sweeps across the row-selector reed 169 as the print-bar 115 sweeps across the chart 13. This row-selector reed 169 is the switch which energizes the common lead to all the signal relays in a row 167. Hence, it is impossible for the signal selector 165 to get out of step with the print-bar 115 in this system.

The column selector utilized for the signal selector matrix 165 depends upon the configuration of the specific system. In some systems, a single measuring circuit is programmed among each of the columns 166 in sequence. In this type of system, a stepping switch 171 is provided which selects the appropriate column 166. This stepping switch 171 is provided with sufficient contacts 172–179 so that it simultaneously selects the column 167 of signal relays 164 to be energized and also the appropriate print solenoid 117 to which the print pulse must be directed. The stepping switch 171 is caused to index ahead one step when the print-bar 115 reaches the end of one upward or downward sweep and pulls in a limit switch (not shown) at top or bottom.

A rectifier 180 connected in series with each signal relay 164, as shown in FIG. 20, prevents the energization of any relay 164 other than the one intended to be energized at a given time. This is accomplished by blocking the current that would otherwise flow through various roundabout paths, at one point at least in each such possible path.

If the signal selector matrix 165 of FIG. 20 were to be used for the chart 13 shown in FIG. 2, two variables in two colors would be printed on each chart-frame 14—14. This could be done by energizing the rotary solenoid 147 (causing ribbon shift) each time the print-bar 115 travels downward (in which case the chart-frame 14—14 of one column 102 would have two variables recorded in two colors on an up and down sweep of the print-bar 115 with one color printed on the up sweep and a second color on the down sweep), or the rotary solenoid 147 could be energized during four consecutive sweeps of the print-bar 115 and de-energized during the following four consecutive sweeps of the print-bar 115 (in which case the first thirty-two variables would be printed in one color on the thirty-two chart-frames 14—14 sweeping the entire chart 13 and the second thirty-two variables would be recorded in a second color on the same thirty-two chart-frames 14—14 as the entire chart 13 is swept a second time).

In an alternate configuration of the system, a separate measuring circuit may be provided for each vertical column. In this event, there is no column selector utilized; all columns are always in use on every sweep of the print-bar. Thus, all print solenoids operate independently of the others and a point is printed in every chart-frame on each sweep.

The measuring circuit of the apparatus of this invention is essentially of the potentiometer or Wheatstone bridge type, depending upon the application. The potentiometer circuit is used to measure voltages and currents, and the Wheatstone bridge to measure resistance. Characteristic of either a potentiometer or a Wheatstone bridge circuit is the use of a precision voltage divider or "slide wire" which is mechanically linked to the indicator or recorder. The voltage divider or commutator 50 described previously herein, is used in the bridge circuit of this invention. The commutator 50 is mechanically linked to the travel of the print-bar 115 across the recording chart 13 so that there is a position on the periphery of the commutator 50 corresponding precisely to each point on each recording chart-frame 14.

Figure 23:
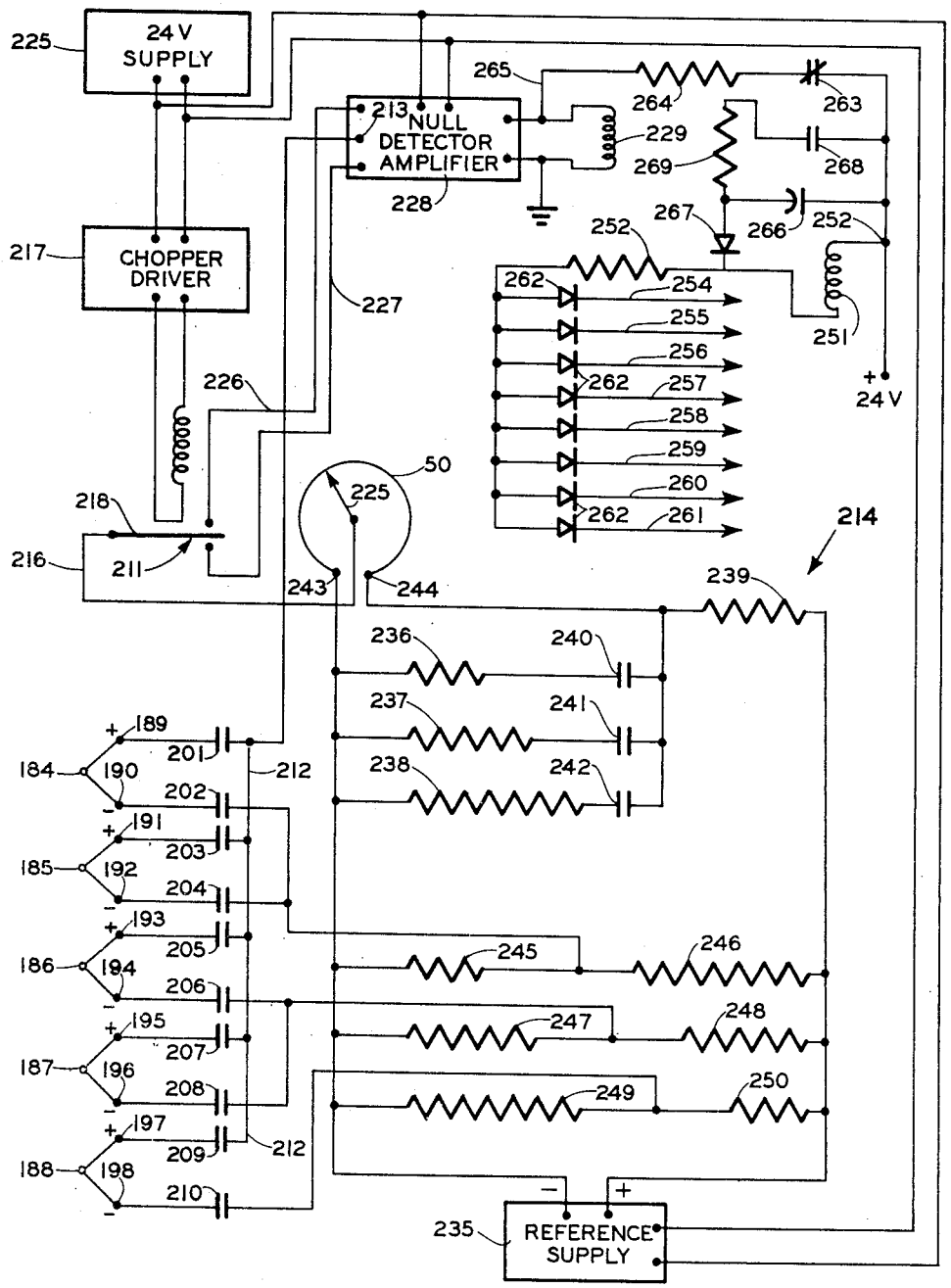
FIG. 23 is a schematic diagram illustrating the measuring circuit of this invention.
Figure 24:
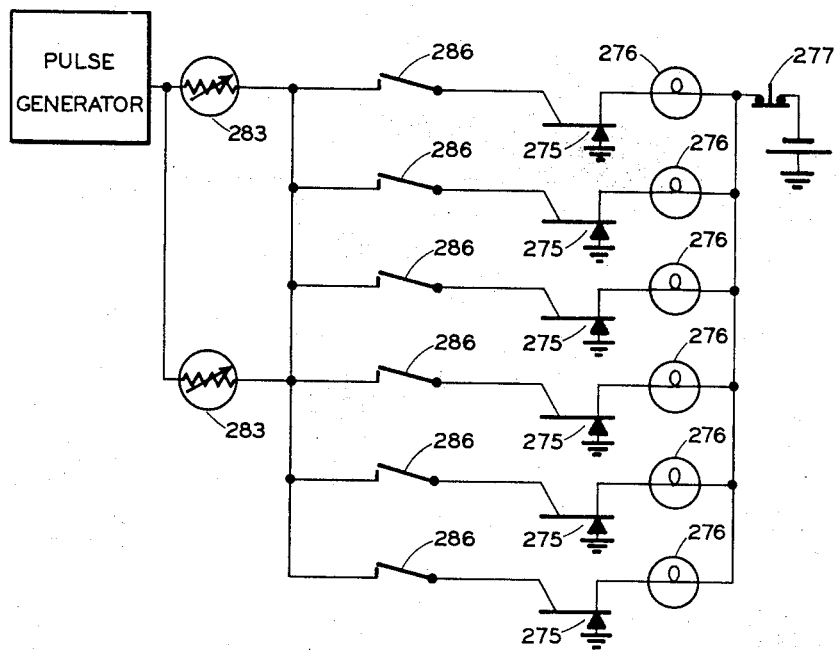
FIG. 24 is a schematic diagram illustrating the alarm circuit of this invention.

The circuitry of the potentiometer bridge according to this invention is shown in FIG. 23. A number of sources 184–188 of signals to be measured are supplied to a plurality of terminals 189–198. Each of the terminals 189–198 is connected to one of the group of switches 201–210. The switches 201–210 are activated automatically by the relays 164 of the signal relay matrix 165 of FIG. 20. Thus, there may be many more signal sources than are shown in FIG. 24. The signal sources 184–188 may supply any direct voltage signal. Many unknowns to be measured furnish a direct voltage signal readily, such as temperatures by means of thermocouples 184–188. Other unknowns can, of course, be transformed into the correct signal with proper transducers.

The unknown signals are switched on, one at a time, by the switches 201–210. One side of the unknown voltage (in the example shown in FIG. 23, the positive side) is supplied to the center top terminal 213 of the input transformer (not shown) of the null detector amplifier 238 by a common lead 212. The other side of the unknown voltage is connected into a bridge circuit 214. The arm 215 of the commutator 50, which corresponds to point 80 of FIG. 10 is connected by means of a conductor 216 to the moving arm 218 of a chopper 211.

The chopper 211 is powered by a 24 volt supply 225 through a chopper-driver 217 providing a frequency preferably of at least about 400 cycles per second. The direct voltage that is supplied to the chopper arm 218 of chopper 211 is changed to a square wave alternating current due to the fact that the chopper arm 218 alternately connects one side of the signal through conductors 226 and 227 to alternate ends of input transformer (not shown) of the null detector amplifier 228. The amplifier 228 amplifies the low level alternating current signal to a magnitude large enough to actuate the print relay 229 connected thereto.

The bridge circuit 214 provides a reference signal against which the unknown signal is compared. When the unknown voltage is equal and opposite to the voltage generated within the bridge 214, the net input to the amplifier 228 is zero, and consequently no output exists and the print relay 229 is deenergized. This is called the null. When there is a difference between the unknown and the bridge voltages, the amplifier 228 has a finite net input and the relay 229 is energized.

A highly-regulated, very stable voltage is supplied to the bridge 214 by a reference supply 235. The bridge 214 has multiple ranges and uses four of the resistors shown in measuring the unknown signal that is supplied to it at a given time. Resistors 236, 237 and 238 are shunting resistors that can be connected across the commutator 50 and are used in setting the voltage span covered by the commutator 50. One of the resistors 236–238 combined with resistor 239 sets the value of voltage over which the recorder sweeps from start to finish of a chart-frame 14. Switches 240, 241 and 242, which are controlled by the relay matrix 165, are provided for connecting any one or more of the resistors 236–238 into the span arm of the bridge 214, thus providing a plurality of voltage spans selectively available depending upon the unknown to be measured. Seven spans are available with the resistors 236–238 shown in FIG. 23. However, it is apparent that the number of spans can be increased by adding to the number of span resistors and to the number of controls provided by the relay matrix 165. Since many of the unknown signals can use the same voltage span, it is usually not necessary to have as many voltage spans as unknown signals.

Resistors 245–250 make up three zero suppression arms in the bridge 214. The ratio of the resistances 245, 246 allows measured voltage to be suppressed from zero by connecting it through the appropriate switch 202, 204, 206, 208, or 210 to a point at the desired potential in the circuit 214. For example, assuming the measured voltage is in millivolts, the voltage does not necessarily need to go from zero to ten millivolts for full scale on the recorder chart. It could go from minus six to plus 4 or plus 7 to 21 millivolts.

The unknown voltages are supplied one at a time to the suppression arms of the bridge between resistors 245–246, 247–248, or 249–250. Assuming that the commutator arm 215 rotates clockwise the unknown voltage is connected to the bridge 214 when the commutator arm 215 starts at contact 243. The arm 215 continues until the resistance of the commutator 50 balances the bridge 214. At this time the net voltage supplied through conductor 216 to the chopper 217 drops to zero and consequently the voltage supplied to the null detector amplifier 228 drops to zero. The print relay 229 is then de-energized and the printing mechanism 116 places a dot on the chart 13. The commutator arm 215 continues to contact 244 and at this time the unknown voltage being measured is switched off.

As the commutator arm 215 rotates it will pass between the terminals 243 and 244 on the commutator 50. At this time the print-bar 115 will be passing between chart-frames 14—14. There will be no voltage supplied to the chopper 211 from the bridge 214 and, consequently, the amplifier will not supply current to the print relay 229. If no provision were made for this condition, the printing mechanism 116 would be activated between chart-frames 14—14. FIG. 23 includes a diagram of the circuit for insuring that the print relay 229 remains energized while the commutator arm 215 passes between the terminals 243 and 244.

One side of a print lock out relay coil 251 is connected to a 24 volt supply at terminal 252. The other side of the print lock out relay 250 is connected through a resistor 253 to a plurality of leads 254–261 connected to the magnetic reed switches 169—169 of the row selector 168. When the switches 169—169 are closed, current flows to energize the print lock out relay 251. A diode 262 is provided in each of the leads 254–261 to prevent reverse current, which would allow more than one horizontal row 167 in the relay matrix 165 to be energized. As the print-bar 115 moves over the chart 13, the magnet 170 passes between the switches 169—169 at the same time that the print-bar 115 passes between the chart-frames 14—14 and at the same time that the commutator arm 215 passes between the terminal 243 and 244. When the magnet 170 is between the switches 169—169, there is no current through any of the leads 254—261 and the print lock out relay 251 is de-energized. De-energizing the relay 251 closes the switch 263 supplying current through resistor 264 through the conductor 265, which is connected to the print relay 229, as shown in FIG. 23. Thus, the print relay 229 is kept energized during the particular time when it receives no current from the amplifier 228 because of the commutator arm 215 being between terminals 243 and 244. When one of the switches 169—169 is again closed, the current is again supplied to the print lock out relay 251, while the commutator arm 215 has completed its travel between terminals 243 and 244. For proper timing, however, it is preferred to have the print lock out relay 251 energized slowly and thus open switch 263 with some slight delay. The capacitor 266 and diode 267 aid in accomplishing this delay. When the circuit to the print lock out relay 251 is re-established, the capacitor is charged first, delaying the activation of the relay 251. However, the diode 267 prevents discharging of the capacitor 266 through the relay 251 which would delay the drop out. Energizing the relay 251 closes the switch 268, causing the capacitor 266 to discharge through the resistor 269. The effect of the diode 267, capacitor 266, switch 268 and resistor 269 is to make a slow energize, fast de-energize relay out of relay 251.

In the sweep balance recorder the print-bar 115 is driven at more or less the same constant speed across the chart 13. Synchronized with the motion of the print-bar 115 is the voltage divider 50 which generates a known reference voltage at each incremental position across its span. At the instant the reference voltage is precisely equal to an unknown voltage to be recorded, an electric pulse is generated which causes the printing mechanism 116 to print a dot on a chart-frame 14. The position of the dot on the chart-frame 14 represents the measured variable at that instant.

In some cases it is desirable to establish preset alarm levels which will indicate by audible alarm, flashing light, or other means the fact that a measured variable has gone outside normal limits. This invention describes a means by which a simple alarm circuit utilizing all solid state components without moving parts of any kind can be added to a sweep balance recorder. In addition, it is conceivable that the alarm might be used in some applications where a permanent record is not required nor desired. Hence the alarm system can be divorced from recording, although a sweep balance voltage divider is still required.

The electric pulse which causes the printing mechanism 116 to print the dot described in the preceding paragraph is used in this system to set off an alarm if it occurred at such a time as to represent the measured variable outside the normal range. Referring to FIG. 24, a circuit element utilized for the alarm system is a silicon controlled rectifier 275. This is a semi-conductor device which has many of the characteristics of a thyratron; that is it has three elements, analogous to the anode, cathode, and grid or "trigger." The impedance between anode and cathode is very high, essentially infinite, until an external voltage pulse is applied to its "trigger." At this time the anode to cathode impedance drops to a very low level, essentially a short circuit so that an alarm 276 is energized. The device remains in this broken down condition even after the external pulse has gone away, so long as load current is passed through the device. When the anode to cathode current is interrupted, however, the device instantaneously resets itself to the infinite impedance condition. In this invention a separate silicon controlled rectifier 275 is provided for each measured variable on which an alarm circuit is to be applied. The silicon controlled rectifier 275 acts as a switch which turns on the alarm 276 when an off-normal condition exists. The alarm 276 stays on until it is reset externally, usually by a manual pushbutton connected to a normally closed reset switch 277 indicating that an operator's attention has been drawn to the abnormal condition.

The operating parameters of the common silicon controlled rectifiers are such that the same voltage pulse which is used to operate the printing mechanism 116, commonly 24 volts D.C., can be used directly to fire the "trigger" of the silicon controlled rectifier 275. All that is required, then, is a gating circuit which allows the printing pulse to reach the trigger if the pulse occurs on a portion of a chart-frame 14 representing an off normal measurement, but preventing it from reaching the trigger if the variable appears in the normal range. Obviously this gating circuit could be a device like a cam and cam-follower operating a switch. In such a case the cam would be synchronized with the sweep of the voltage divider and a "valley" would be milled onto the cam in a portion of the periphery representing the "alarm zone" of the measured variable in question. If the switch were of normally open operation, it would be inserted in the lead carrying the print pulse and connected to the trigger of the silicon controlled rectifier 275. Then if the print pulse occurred when the cam follower was on the "valley," the pulse would set off the alarm 276; if on the other hand it occurred when the cam follower was on a position indicating the "normal" range of the variable, the switch would represent an open circuit and the alarm 276 would not be set off.

Figure 25:
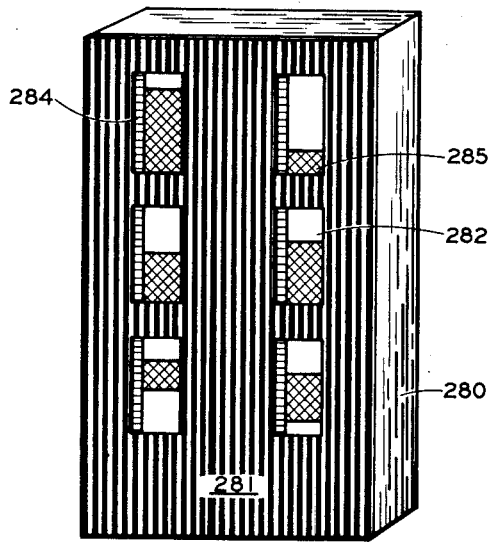
FIG. 25 is a perspective view of a light box used in the alarm system.

In order to eliminate the moving parts and inconvenience of setting a mechanical cam and cam follower, this invention has utilized as a range-detector switch an optical "gate" controlled by the presence or absence of light. A "light box" 280 (FIG. 9 and FIG. 25) is provided with a mask 281 allowing a narrow light slit 282 analogous in extent to the ordinate of each measured variable in the sweep balance recorder. A photosensitive resistor 283, such as a cadmium selenide crystal is mounted in such a way that it sweeps along this light slit 282 synchronized with the sweep of the voltage divider in the measuring circuit. The light slits 282 correspond in length to the height of a chart-frame 14 and are calibrated with markings 284 that correspond to divisions on the chart-frames 14—14. Any desired portion of the slit in the mask over the light box can be further masked or blocked off by such means of a piece of pressure sensitive opaque tape 285, or in other ways. Thus as the photosensitive resistor 282 sweeps along the slit, it is alternately exposed to bright light and darkness depending on the position of the masking tape 285. The characteristics of a photosensitive resistor 283 are somewhat analogous to a switch in that its internal impedance is very high when dark, but very low when exposed to a bright light. Hence the operation of the photosensitive resistor is somewhat similar to the operation of the hypothetical cam, cam follower, and siwtch in the preceding paragraph. The position of the masking tape 285 is analogous to the position of the "valley" on the cam and the resistance of the photosensitive resistor 283 varies from high to low as it passes over the light and dark portions. The photosensitive resistor 283 is simply wired in series between the pulse generator and the trigger of the silicon controlled rectifier 275 and performs the gating function required.

Since sweep balance recorders are generally used to record a number of variables, there must be a separate alarm circuit including a silicon controlled rectifier 275 and light slit 282 for each point. The photosensitive resistor 283, however, will generally be the time shared among all of the points being recorded in one vertical column 102 of the chart-frames 14—14. Most conveniently the photosensitive resistor 283 will be mounted on a bracket rigidly attached to the print bar in the recorder. The light slits will be lined up, one above the other, in positions exactly analogous to the chart-frames in a vertical column. The same relay matrix 165 which switches one measured variable at a time into the sweep balance measuring circuit is provided with another set of contacts 286 to switch the photosensitive resistor 283 onto the trigger of each respective silicon controlled rectifier 275 in sequence as the recorder scans the successive points.

To summarize, a preferred form of sweep-balance recorder 101 according to the present invention comprises: a chart 13 held in a fixed position, preferably on a platen 11, during recording, containing indicia 14 thereon defining areas for a plurality of graphs, preferably arranged in columns 102 and rows 103; marking means including a print bar 115 substantially parallel to said chart and preferably extending in a direction substantially perpendicular to said columns, having mounted thereon at least one print hammer 118, and preferably one for each column of graphs; a member 120 containing marking material between each said print hammer 118 and said chart 13; means for moving each said print hammer 118 along said print bar 115 across at least a substantial portion of the width of a graph 14; means for moving said print bar 115 in the direction of said columns over at least a substantial portion of the area occupied by said graphs 14, preferably traversing said columns a substantial number of times during each movement of said print hammers 118 across at least a substantial portion of the width of a graph 14; a measuring circuit including at least one voltage source 235 and at least one voltage divider circuit 50 having a movable member 225 thereof providing an output that varies with the position of said movable member 225; means 157 for moving said movable member 225 in a predetermined manner in synchronization with the movement of said print bar 115; means 165, 201–210 for connecting in circuit with said varying output of said voltage divider circuit 50 in a predetermined sequence a plurality of electrical quantities 184–188 to be measured and recorded; means 214, 228 responsive to said voltage divider output and each said quantity to be measured for providing a detectable signal at the instant when said output and said quantity have a predetermined relationship; and means 229 responsive to said signal for causing one said print hammer 118 to provide a mark 121 on the graph 14 over which it is passing at said instant; said mark 121 providing an indication of the value of said quantity of said instant.

The sweep-balance recorder preferably includes means 236–250 for providing a predetermined calibration selectively between each said quantity 184–188 and its respective graph 14, said calibration preferably being controllable as to both zero-suppression 245–250 and span 236–242, and which calibrations may be different for different graphs 14 and for different quantities 184–188. The platen 11 preferably has reference marks 15 thereon; and means 20, 21 preferably are included for clamping said chart 13 and stretching it to position marks 14 thereon in alignment and registry with said reference marks 15 on said platen 11 and for maintaining the dimensions and positions of the graphs on said chart 13 substantially constant despite any variations in humidity and other ambient conditions during recording. The recorder 101 preferably includes at least one light source positioned behind said platen 11; the materials and thickness of said platen 11 and said chart 13 being such as to transmit sufficient light from each said source to make readily perceptible the graphs and associated markings on said chart.

In a preferred form of the invention, the signal providing means comprises a null detector 228, and the predetermined relationship of the voltage divider output and the quantity to be measured provides a net input of zero to the null detector 228. Any of the electrical quantities to be measured may be provided by transducers as measures of other quantities, which may be electrical, pneumatic, chemical, visual, auditory, heat, temperature, or any other type of quantity that can be transduced into a detectable electrical quantity.

The circuit connecting means preferably comprises at least one relay 164 for each said graph 14 and means 168, 171 for energizing and deenergizing said relays in a predetermined sequence to cause each said electrical quantity 184–188 to be recorded on a predetermined graph 14; said last mentioned means comprising a first plurality of switches 168 responsive to the position of said print bar hammer 118 at any given instant and a second plurality of switches 171–179 for selecting the column 102 in which said mark 121 is to be provided at any given instant. The first plurality of switches 168 preferably are magnetically operable and so arranged as to be actuated in a predetermined manner by at least one magnet connected to or otherwise movable in synchronization with said print bar 115. The second plurality of switches 171–179 preferably include a stepping switch 171 actuatable in response to the movement of said print bar 115 to switch at least one connection from the means for actuating the print hammer 118 traversing a given column 102 of graphs 14 to the means for actuating a print hammer 118 traversing a different column 102 of graphs 14 in a predetermined sequence, as said print bar 115 completes its traversing of said columns 102 in one direction and reverses its direction to traverse said columns 102 in the opposite direction, and at least one limit switch responsive to the movement of said print bar 115 for actuating said stepping switch 171.

The recorder 101 preferably has warning or other attention attracting means comprising means for providing a change readily discernible by at least one of the human senses, such as a visual or auditory change signal. This may include at least one electrically actuatable device 276 such as a light, each said light being positioned to change the illumination at a predetermined location on said chart 13, as in the vicinity of a predetermined graph 14, when a predetermined quantity 184–188 is measured to be outside a predetermined range. The change-providing means preferably comprises a trigger-controlled rectifier 275 connected in circuit with each said light 276, gating means for triggering each said rectifier 275 in response to said detectable signal when said signal corresponds to a measured value outside said predetermined range; each said gating means comprising a light source at least one photosensitive device 283 mounted on or otherwise movable in synchronization with said print bar 115, a mask 281, 285 adjacent said light source, at least one opening 282 in said mask so positioned that light from said light source can reach said photosensitive device 283 when said print bar 115 is within a predetermined range of positions thereof, said photosensitive device 283 being connected in circuit with said rectifier 275 to control the conditions under which said rectifier 275 can be triggered by said signal by providing one extreme resistance condition (either very high or virtually negligible) in said photosensitive device 283 when said print bar 115 is in the range of positions corresponding to said predetermined range of measured values and providing the opposite extreme resistance condition in said photosensitive device 283 when said print bar 115 is outside said range of positions; and means 286 for connecting each said photosensitive device 283 in circuit with its respective rectifier 275 during the time when the electrical quantity to be measured and recorded on its respective graph 14 is connected in circuit with said varying output voltage for measurement and recording on said respective graph 14.

The reference characters in the above summary indicate generally the primary components shown in the drawings corresponding to the recited features, to facilitate understanding of the claims. The reference characters are used merely by way of example, however, and not in any limiting sense.

While the forms of the invention herein disclosed constitute preferred embodiments, it is not intended to describe all of the possible equivalent forms or ramifications of the invention. It will be understood that the words used are words of description rather than of limitation, and that various changes, as in shape, relative size, and arrangement of parts, may be made without departing from the spirit or scope of the invention.

What is claimed is:

1. A sweep-balance recorder comprising: a chart held in a fixed position during recording, containing indicia thereon defining a plurality of graphs; marking means including a print bar substantially parallel to said chart, having mounted thereon at least one printing means; means for moving each said printing means along said print bar across at least a substantial portion of the width of a graph; means for moving said print bar in a direction substantially perpendicular to the movement of each said printing means over at least a substantial portion of the area occupied by said graphs; a measuring circuit including at least one voltage source and at least one voltage divider circuit having a movable member thereof providing an output that varies with the position of said movable member; means for moving said movable member in a predetermined manner in synchronization with the movement of said print bar; means for connecting in circuit with said varying output of said voltage divider circuit in a predetermined sequence a plurality of electrical quantities to be measured and recorded; means responsive to said voltage divider output and each said quantity to be measured for providing a detectable signal at the instant when said output and said quantity have a predetermined relationship; and means responsive to said signal for causing one said printing means to provide a mark on the graph over which it is passing at said instant; said mark providing an indication of the value of said quantity at said instant.

2. A sweep-balance recorder according to claim 1, wherein said measuring circuit comprises means for providing a predetermined calibration selectively between each said quantity and its respective graph.

3. A sweep-balance recorder according to claim 2, said calibration being controllable as to both zero-suppression and span, and which calibrations may be different for different graphs and for different quantities.

4. A sweep-balance recorder according to claim 1, wherein said chart is positioned on a platen having reference marks thereon; including means for clamping said chart and stretching it to position marks thereon in alignment and registry with said reference marks on said platen and for maintaining the dimensions and positions of the graphs on said chart substantially constant despite any variations in humidity and other ambient conditions during recording.

5. A sweep-balance recorder according to claim 1, wherein said signal providing means comprises a null detector, and wherein said predetermined relationship of said voltage divider output and said quantity to be measured provides a net input of zero to said null detector.

6. A sweep-balance recorder according to claim 2, wherein said graphs are arranged in rows and columns, and wherein said circuit connecting means comprises at least one relay for each said graph and means for energizing and deenergizing said relays in a predetermined sequence to cause each said electrical quantity to be recorded on a predetermined graph; said last mentioned means comprising a first plurality of switches responsive to the position of said print bar at any given instant and a second plurality of switches for selecting the column in which said mark is to be provided at any given instant.

7. A sweep-balance recorder according to claim 6, said first plurality of switches being magnetically operable and so arranged as to be actuated in a predetermined manner by at least one magnet movable in synchronization with said print bar; said second plurality of switches including a stepping switch actuatable in response to the movement of said print bar to switch at least one connection from the means for actuating the printing means traversing a given column of graphs to the means for actuating a printing means traversing a different column of graphs, in a predetermined sequence, as said print bar completes its traversing of said columns in one direction and reverses its direction to traverse said columns in the opposite direction, and at least one limit switch responsive to the movement of said print bar for actuating said stepping switch.

8. A sweep-balance recorder according to claim 1, including attention attracting means comprising means for providing a change readily discernible by at least one of the human senses when a predetermined quantity is measured to be outside a predetermined range.

9. A sweep-balance recorder according to claim 1, including attention attracting means comprising means for providing a change readily discernible by at least one of the human senses including at least one electrically actuatable device for providing said change when a predetermined quantity is measured to be outside a predetermined range; comprising a trigger-controlled rectifier connected in circuit with each said device, and gating means for triggering each said rectifier in response to said detectable signal when said signal corresponds to a measured value outside said predetermined range.

10. A sweep-balance recorder according to claim 9, wherein each said gating means comprises a light source, at least one photosensitive device movable in synchronization with said print bar, a mask adjacent said light source, and at least one opening in said mask so positioned that light from said light source can reach said photosensitive device when said print bar is within a predetermined range of positions thereof, said photosensitive device being connected in circuit with said rectifier to control the conditions under which said rectifier can be triggered by said signal by providing one extreme resistance condition in said photosensitive device when said print bar is in the range of positions corresponding to said predetermined range of measured values and providing the opposite extreme resistance condition in said photosensitive device when said print bar is outside said range of positions.

11. A sweep-balance recorder according to claim 1, including attention attracting means comprising means for providing a visual change including at least one light, each said light being positioned to change the illumination at a predetermined location on said chart when a predetermined quantity is measured to be outside a predetermined range; comprising a trigger-controlled rectifier connected in circuit with each said light, gating means for triggering each said rectifier in response to said detectable signal when said signal corresponds to a measured value outside said predetermined range; each said gating means comprising a light source, at least one photosensitive device mounted on said print bar, a mask adjacent said light source, at least one opening in said mask so positioned that light from said light source can reach said photosensitive device when said print bar is within a predetermined range of positions thereof, said photosensitive device being connected in circuit with said rectifier to control the conditions under which said rectifier can be triggered by said signal by providing one extreme resistance condition in said photosensitive device when said print bar is in the range of positions corresponding to said predetermined range of measured values and providing the opposite extreme resistance condition in said photosensitive device when said print bar is outside said range of positions; and means for connecting each said photosensitive device in circuit with its respective rectifier during the time when the electrical quantity to be measured and recorded on its respective graph is connected in circuit with said varying output voltage for measurement and recording on said respective graph.

12. A sweep-balance recorder comprising: a chart held in a fixed position on a platen during recording, containing indicia thereon defining areas for a plurality of graphs arranged in columns and rows; marking means including a print bar substantially parallel to said chart and extending in a direction substantially perpendicular to said columns, having mounted thereon a print hammer for each column of graphs; a member containing marking material between each said print hammer and said chart; means for moving each said print hammer along said print bar across at least a substantial portion of the width of a graph; means for moving said print bar in the direction of said columns over at least a substantial portion of the area occupied by said graphs, traversing said columns a substantial number of times during each movement of said print hammers across at least a substantial portion of the width of a graph; a measuring circuit including at least one voltage source and at least one voltage divider circuit having a movable member thereof providing an output that varies with the position of said movable member; means for moving said movable member in a predetermined manner in synchronization with the movement of said print bar; means for connecting in a predetermined sequence in circuit with said varying output of said voltage divider circuit a plurality of electrical voltages to be measured and recorded; means responsive to said voltage divider output and each said voltage to be measured for providing a detectable signal at the instant when said output and said voltage have a predetermined relationship; and means responsive to said signal for causing one said print hammer to provide a mark on the graph over which it is passing at said instant;

said mark providing an indication of the value of a quantity represented by said voltage at said instant.

13. A sweep-balance recorder, comprising: a chart fixedly held therein, said chart having a plurality of graphs printed thereon and arranged in columns and rows; a plurality of printers, corresponding to the number of columns of graphs, said printers being supported by a bar reciprocating over the expanse of said chart; measuring means including a voltage divider, bridge circuit, and reference voltage supply for balancing the voltage of input signals to establish a zero net voltage, said voltage divider being synchronized with the movement of said bar; an amplifier and pulse generator to receive the output of said measuring means and to generate an electric pulse activating one of said printers on establishment of a zero net voltage; switching means for selecting and sequentially connecting said input signals to said measuring means, said switching means being synchronized with movement of said bar to connect said electric pulse to a selected printer so that consecutive measurements of each input signal are printed on one of the graphs; and means for detecting variations of said input signal outside of a predetermined range.

14. A sweep-balance recorder according to claim 13, wherein said means for detecting variations of said input signals includes: a plurality of input-signal, range-detector switches, corresponding to the number of columns of said graphs and synchronized with the movement of said bar, said range-detector switches being open during measurement of the portion of the total input signal range that is included within the predetermined range and closed during the measurement of the portion of the total input signal range that is outside of the predetermined range; a group of alarm switches connected to each range-detector switch, with the number of alarm switches in each group corresponding to the number of rows of graphs; and said range-detector switches and alarm switches being connected to said switching means so that said electric pulse is directed to a selected range-detector switch, and when said range detector switch is closed, said electric pulse is further directed to a selected alarm switch to energize an alarm.

15. A sweep-balance recorder according to claim 14, wherein said range-detector switches include: an opaque box having a source of light therein and a plurality of slits for permitting light to pass therethrough, the number of said slits corresponding to the number of said graphs, arranged in columns and rows corresponding to said graphs, and of the same length as the ordinates of said graphs; an opaque mask over each of said slits covering a portion of the ordinate length of said slit that corresponds to the predetermined range of said input signal; and a photo resistor adjacent each column of said slits synchronized to move with said bar, said photo resistor having essentially infinite resistance when dark and essentially zero resistance when exposed to light.

16. A sweep-balance recorder according to claim 15, wherein said alarm switch includes: a silicon controlled rectifier having essentially an infinite impedance between the anode and cathode until a voltage pulse is applied to its control electrode at which time the anode to cathode impedance drops essentially to zero; said silicon controlled rectifier having the anode and cathode connected into an alarm circuit and the control electrode connected to said range-detector switch.

17. A sweep-balance recorder according to claim 13, wherein said measuring circuit produces a first zero net voltage on balancing said input signal and a second zero net voltage between switching of said input signals, and said sweep balance recorder includes suppression means provided to prevent said pulse generator from generating an electric pulse to activate one of said printers on the production of the second zero net voltage.

18. A sweep-balance recorder according to claim 17, wherein said pulse generator is a first relay having open contacts when energized that drop out and close a switch activating the printer when the measuring circuit establishes a zero net voltage and said suppression means is a second relay energized through the switching means and drops out between switching of input signals closing a circuit to the coil of said first relay keeping said first relay energized during the production of the second zero net voltage.

19. A sweep-balance recorder according to claim 18, wherein a capacitor is connected in parallel with the coil of said second relay so that said second relay is slowly energized and quickly deenergized; said capacitor circuit including a diode to prevent discharge of said capacitor through the coil of said second relay; said second relay closing a circuit to discharge said capacitor when said second relay is energized.

20. Apparatus for examining varying electrical signals comprising: measuring means for sequentially measuring a plurality of input signals and for generating an electric pulse when the value of each of said input signals is established; means for defining a selected portion of the total range of each of said input signals; a plurality of input-signal, range-detector switches, said range-detector switches being open during measurement of the portion of the total input signal range that is included within said selected portion and closed during measurement of the portion of the total input signal range that is outside of said selected portion; a plurality of alarm switches connected to said range-detector switches so that when said electric pulse is generated during the period that said range-detector switch is closed, said alarm switch energizes an alarm.

21. Apparatus according to claim 20, wherein said means for defining a selected portion of the total range of each of said input signals include a mask over a portion of a light slit with the length of said light slit corresponding to the total range of said input signal and the length of said mask corresponding to said selected portion and wherein said range-detector switches are photo resistors adjacent each light slit synchronized with said measuring means to move across the length of said light slit as said input signal is measured, said photo resistors having essentially infinite resistance when dark and essentially zero resistance when exposed to light.

22. Apparatus according to claim 21, wherein each said alarm switch includes a silicon controlled rectifier having essentially an infinite impedance between the anode and cathode until a voltage pulse is applied to its control electrode at which time the anode to cathode impedance drops essentially to zero, said silicon controlled rectifier having the anode and cathode connected into an alarm circuit and the control electrode connected to said range-detector switch.

References Cited in the file of this patent

UNITED STATES PATENTS

| | | |
|---|---|---|
| 1,103,862 | Bennett | July 14, 1914 |
| 2,661,260 | Salzman | Dec. 1, 1953 |
| 2,787,511 | Ehret | Apr. 2, 1957 |

FOREIGN PATENTS

| | | |
|---|---|---|
| 687,653 | Great Britain | Feb. 18, 1953 |